United States Patent
Gergets et al.

(10) Patent No.: US 9,346,397 B2
(45) Date of Patent: May 24, 2016

(54) SELF-POWERED LIGHT BAR

(75) Inventors: Paul M. Gergets, St. John, IN (US); Jacek J. Jozwik, Mokena, IL (US)

(73) Assignee: Federal Signal Corporation, Oak Brook, IL (US)

(*) Notice: Subject to any disclaimer, the term of this patent is extended or adjusted under 35 U.S.C. 154(b) by 490 days.

(21) Appl. No.: 13/350,318

(22) Filed: Jan. 13, 2012

(65) Prior Publication Data

US 2012/0201041 A1    Aug. 9, 2012

Related U.S. Application Data

(63) Continuation of application No. PCT/US2010/042002, filed on Jul. 14, 2010, which is a continuation-in-part of application No. 13/040,834, filed on Mar. 4, 2011, now Pat. No. 8,636,395, which (Continued)

(51) Int. Cl.
| | | |
|---|---|---|
| *B60Q 1/00* | (2006.01) | |
| *B60Q 1/26* | (2006.01) | |
| *F21S 10/06* | (2006.01) | |
| *F21S 8/10* | (2006.01) | |
| *F21V 23/04* | (2006.01) | |

(52) U.S. Cl.
CPC .............. *B60Q 1/2611* (2013.01); *F21S 10/06* (2013.01); *F21S 48/212* (2013.01); *F21V 23/04* (2013.01)
USPC .......................................... 362/493; 362/542

(58) Field of Classification Search
CPC ........... F21S 9/037; F21S 9/035; F21S 10/06; B60Q 1/2611; B60Q 1/52

USPC .................................................. 362/493, 183
See application file for complete search history.

(56) References Cited

U.S. PATENT DOCUMENTS

| | | | |
|---|---|---|---|
| 4,155,042 | A | 5/1979 | Permut et al. |
| 4,633,229 | A | 12/1986 | Iacono et al. |
| 4,722,030 | A | 1/1988 | Bowden |
| 4,789,904 | A | 12/1988 | Peterson |
| 5,185,697 | A | 2/1993 | Jacobs et al. |
| 5,487,069 | A | 1/1996 | O'Sullivan et al. |

(Continued)

FOREIGN PATENT DOCUMENTS

| | | |
|---|---|---|
| BE | 1006768 A6 | 12/1994 |
| CA | 2426243 A1 | 10/2003 |

(Continued)

OTHER PUBLICATIONS

Morris, Tom, "*IRC's Anotherm™ PC Boards Eliminate Heatsinks for Automotive LED Applications*", TT electronics (Mar. 16, 2004).

(Continued)

*Primary Examiner* — Evan Dzierzynski
(74) *Attorney, Agent, or Firm* — Leydig, Voit & Mayer, Ltd.

(57) ABSTRACT

An emergency system for a vehicle integrates many disparate equipment into single housing, including the power supply for the equipment. In one embodiment of the invention, the emergency system is a light bar. The light bar houses a power source comprising solar cell panels, a Lithium-Ion battery pack and a connection to an external supply such as the vehicle's electrical power. Energy for operating the light bar is provided by one or more of the power sources, depending on operating conditions of the light bar and each of the power sources.

16 Claims, 23 Drawing Sheets

Related U.S. Application Data is a continuation of application No. 12/350,506, filed on Jan. 8, 2009, now Pat. No. 7,905,640, which is a continuation of application No. 11/394,752, filed on Mar. 31, 2006, now Pat. No. 7,476,013, application No. 13/350,318, which is a continuation-in-part of application No. 11/548,209, filed on Oct. 10, 2006, which is a continuation-in-part of application No. 11/505,642, filed on Aug. 17, 2006, now Pat. No. 7,746,794.

(60) Provisional application No. 61/225,479, filed on Jul. 14, 2009, provisional application No. 60/775,634, filed on Feb. 22, 2006.

(56) References Cited

U.S. PATENT DOCUMENTS

| | | | |
|---|---|---|---|
| 5,539,398 | A | 7/1996 | Hall et al. |
| 5,567,036 | A | 10/1996 | Theobald et al. |
| 5,572,201 | A | 11/1996 | Graham et al. |
| 5,602,739 | A | 2/1997 | Haagenstad et al. |
| 5,689,233 | A | 11/1997 | Kurisu et al. |
| 5,815,417 | A | 9/1998 | Orr et al. |
| 5,826,180 | A | 10/1998 | Golan |
| 5,861,959 | A | 1/1999 | Barak |
| 5,884,997 | A | 3/1999 | Stanuch et al. |
| 5,887,139 | A | 3/1999 | Madison, Jr. et al. |
| 5,926,113 | A | 7/1999 | Jones et al. |
| 5,931,573 | A * | 8/1999 | Knox ............................ 362/493 |
| 5,937,029 | A | 8/1999 | Yosef |
| 5,986,575 | A | 11/1999 | Jones et al. |
| 6,046,824 | A | 4/2000 | Barak |
| 6,081,191 | A | 6/2000 | Green et al. |
| 6,100,801 | A | 8/2000 | Plummer |
| 6,112,088 | A | 8/2000 | Haartsen |
| 6,149,288 | A | 11/2000 | Huang |
| 6,154,005 | A * | 11/2000 | Hyogo ................. B60L 11/182 320/108 |
| 6,154,787 | A | 11/2000 | Urevig et al. |
| 6,161,066 | A | 12/2000 | Wright et al. |
| 6,167,036 | A | 12/2000 | Beven |
| 6,169,476 | B1 | 1/2001 | Flanagan |
| 6,188,939 | B1 | 2/2001 | Morgan et al. |
| 6,192,232 | B1 | 2/2001 | Iseyama |
| 6,243,026 | B1 | 6/2001 | Jones et al. |
| 6,249,812 | B1 | 6/2001 | Cromer et al. |
| 6,330,025 | B1 | 12/2001 | Arazi et al. |
| 6,411,874 | B2 | 6/2002 | Morgan et al. |
| 6,437,692 | B1 | 8/2002 | Petite et al. |
| 6,474,557 | B2 | 11/2002 | Mullins et al. |
| 6,542,602 | B1 | 4/2003 | Elazar |
| 6,564,342 | B2 | 5/2003 | Landan |
| 6,566,842 | B1 | 5/2003 | Kirkpatrick |
| 6,567,747 | B1 | 5/2003 | Lange et al. |
| 6,574,561 | B2 | 6/2003 | Alexander et al. |
| 6,593,701 | B1 * | 7/2003 | Hsieh ............................ 315/159 |
| 6,612,713 | B1 * | 9/2003 | Kuelbs ........................ 362/102 |
| 6,624,750 | B1 | 9/2003 | Marman et al. |
| 6,641,284 | B2 | 11/2003 | Stopa et al. |
| 6,747,557 | B1 | 6/2004 | Petite et al. |
| 6,762,686 | B1 | 7/2004 | Tabe |
| 6,800,958 | B1 * | 10/2004 | Baer ..................... B60R 16/027 307/10.1 |
| 6,856,343 | B2 | 2/2005 | Arazi et al. |
| 6,868,340 | B2 | 3/2005 | Alexander et al. |
| 6,891,838 | B1 | 5/2005 | Petite et al. |
| 6,914,533 | B2 | 7/2005 | Petite |
| 6,930,596 | B2 | 8/2005 | Kulesz et al. |
| 6,942,360 | B2 | 9/2005 | Chou et al. |
| 6,959,079 | B2 | 10/2005 | Elazar |
| 6,966,682 | B2 | 11/2005 | Frank et al. |
| 6,976,769 | B2 | 12/2005 | McCullough et al. |
| 6,982,518 | B2 | 1/2006 | Chou et al. |
| 6,999,876 | B2 | 2/2006 | Lambert et al. |
| 7,010,106 | B2 | 3/2006 | Gritzer et al. |
| 7,010,109 | B2 | 3/2006 | Gritzer et al. |
| 7,015,806 | B2 | 3/2006 | Naidoo et al. |
| 7,016,478 | B2 | 3/2006 | Potorny et al. |
| 7,016,647 | B2 | 3/2006 | Albert et al. |
| 7,034,678 | B2 | 4/2006 | Burkley et al. |
| 7,044,616 | B2 | 5/2006 | Shih |
| 7,057,517 | B1 | 6/2006 | Convery |
| 7,058,710 | B2 | 6/2006 | McCall et al. |
| 7,065,445 | B2 | 6/2006 | Thayer et al. |
| 7,070,418 | B1 | 7/2006 | Wang |
| 7,080,544 | B2 | 7/2006 | Stepanik et al. |
| 7,091,852 | B2 | 8/2006 | Mason et al. |
| 7,103,511 | B2 | 9/2006 | Petite |
| 7,148,803 | B2 | 12/2006 | Bandy et al. |
| 7,158,026 | B2 | 1/2007 | Feldkamp et al. |
| 7,240,328 | B2 | 7/2007 | Beckett et al. |
| 7,250,853 | B2 | 7/2007 | Flynn |
| 7,281,818 | B2 | 10/2007 | You et al. |
| 7,295,128 | B2 | 11/2007 | Petite |
| 7,305,082 | B2 | 12/2007 | Elazar et al. |
| 7,319,397 | B2 | 1/2008 | Chung et al. |
| 7,327,930 | B2 | 2/2008 | Koren et al. |
| 7,333,445 | B2 | 2/2008 | Ilan et al. |
| 7,346,186 | B2 | 3/2008 | Sharoni et al. |
| 7,386,105 | B2 | 6/2008 | Wasserblat et al. |
| 7,391,299 | B2 | 6/2008 | Bender et al. |
| 7,474,633 | B2 | 1/2009 | Halbraich et al. |
| 7,476,013 | B2 | 1/2009 | Gergets et al. |
| 7,480,501 | B2 | 1/2009 | Petite |
| 7,526,322 | B2 | 4/2009 | Whistler |
| 2001/0024163 | A1 | 9/2001 | Petite |
| 2002/0019725 | A1 | 2/2002 | Petite |
| 2002/0024424 | A1 | 2/2002 | Burns et al. |
| 2002/0048174 | A1 * | 4/2002 | Pederson ..................... 362/487 |
| 2002/0067615 | A1 | 6/2002 | Muller |
| 2002/0071267 | A1 | 6/2002 | Lekson et al. |
| 2002/0071268 | A1 | 6/2002 | Pederson |
| 2002/0112026 | A1 | 8/2002 | Fridman et al. |
| 2002/0116242 | A1 | 8/2002 | Vercellone et al. |
| 2002/0181232 | A1 | 12/2002 | Martineau |
| 2003/0028536 | A1 | 2/2003 | Singh et al. |
| 2003/0061323 | A1 | 3/2003 | East et al. |
| 2003/0069688 | A1 | 4/2003 | Mosis |
| 2003/0078029 | A1 | 4/2003 | Petite |
| 2003/0095688 | A1 | 5/2003 | Kirmuss |
| 2003/0141990 | A1 | 7/2003 | Coon |
| 2004/0008519 | A1 | 1/2004 | Todaka et al. |
| 2004/0044553 | A1 | 3/2004 | Lambert et al. |
| 2004/0049345 | A1 | 3/2004 | McDonough et al. |
| 2004/0057410 | A1 | 3/2004 | Kaipiainen et al. |
| 2004/0070515 | A1 | 4/2004 | Burkley et al. |
| 2004/0114391 | A1 | 6/2004 | Watkins et al. |
| 2004/0130890 | A1 * | 7/2004 | Lopez ........................... 362/122 |
| 2004/0137768 | A1 | 7/2004 | Haehn et al. |
| 2004/0142678 | A1 | 7/2004 | Krasner |
| 2004/0145481 | A1 | 7/2004 | Dilbeck et al. |
| 2004/0183687 | A1 | 9/2004 | Petite et al. |
| 2004/0189490 | A1 | 9/2004 | Halishak |
| 2004/0193740 | A1 | 9/2004 | Kasmirsky |
| 2004/0246144 | A1 | 12/2004 | Siegel et al. |
| 2005/0001720 | A1 | 1/2005 | Mason et al. |
| 2005/0018622 | A1 | 1/2005 | Halbraich et al. |
| 2005/0034075 | A1 | 2/2005 | Riegelman et al. |
| 2005/0047167 | A1 | 3/2005 | Pederson et al. |
| 2005/0109394 | A1 | 5/2005 | Anderson |
| 2005/0117326 | A1 * | 6/2005 | Ma ............................... 362/102 |
| 2005/0123115 | A1 | 6/2005 | Gritzer et al. |
| 2005/0134283 | A1 | 6/2005 | Potempa |
| 2005/0151642 | A1 | 7/2005 | Tupler et al. |
| 2005/0162265 | A1 | 7/2005 | Werner et al. |
| 2005/0174229 | A1 | 8/2005 | Feldkamp et al. |
| 2005/0176403 | A1 | 8/2005 | Lalos |
| 2005/0190055 | A1 | 9/2005 | Petite |
| 2005/0197871 | A1 | 9/2005 | Mendonca et al. |
| 2005/0201397 | A1 | 9/2005 | Petite |
| 2005/0219044 | A1 | 10/2005 | Douglass et al. |
| 2005/0239477 | A1 | 10/2005 | Kim et al. |
| 2005/0242969 | A1 | 11/2005 | Deutsch et al. |

(56) References Cited

U.S. PATENT DOCUMENTS

| | | |
|---|---|---|
| 2005/0243867 A1 | 11/2005 | Petite |
| 2005/0245232 A1 | 11/2005 | Jakober et al. |
| 2005/0258942 A1 | 11/2005 | Manasseh et al. |
| 2005/0275549 A1 | 12/2005 | Barclay et al. |
| 2005/0282518 A1 | 12/2005 | D'Evelyn et al. |
| 2006/0002122 A1* | 1/2006 | Griffin .................. 362/493 |
| 2006/0002372 A1 | 1/2006 | Smith |
| 2006/0009190 A1 | 1/2006 | Laliberte |
| 2006/0034070 A1* | 2/2006 | Kovacik et al. ........... 362/157 |
| 2006/0045185 A1 | 3/2006 | Kiryati et al. |
| 2006/0059139 A1 | 3/2006 | Robinson |
| 2006/0061997 A1 | 3/2006 | Lin |
| 2006/0068752 A1 | 3/2006 | Lin et al. |
| 2006/0071775 A1 | 4/2006 | Otto et al. |
| 2006/0092043 A1 | 5/2006 | Lagassey |
| 2006/0109113 A1 | 5/2006 | Reyes et al. |
| 2006/0114853 A1 | 6/2006 | Hasty et al. |
| 2006/0133624 A1 | 6/2006 | Waserblat et al. |
| 2006/0136597 A1 | 6/2006 | Shabtai et al. |
| 2006/0146740 A1 | 7/2006 | Sheynman et al. |
| 2006/0158329 A1 | 7/2006 | Burkley et al. |
| 2006/0179064 A1 | 8/2006 | Paz et al. |
| 2006/0187015 A1 | 8/2006 | Canfield |
| 2006/0190576 A1 | 8/2006 | Lee et al. |
| 2006/0227719 A1 | 10/2006 | Halbraich |
| 2006/0268847 A1 | 11/2006 | Halbraich |
| 2006/0285665 A1 | 12/2006 | Wasserblat |
| 2007/0008174 A1 | 1/2007 | Schwartz |
| 2007/0035962 A1 | 2/2007 | Yurochko |
| 2007/0041220 A1 | 2/2007 | Lynch |
| 2007/0083298 A1 | 4/2007 | Pierce et al. |
| 2007/0122003 A1 | 5/2007 | Dobkin et al. |
| 2007/0194906 A1 | 8/2007 | Sink |
| 2007/0195706 A1 | 8/2007 | Sink |
| 2007/0195939 A1 | 8/2007 | Sink |
| 2007/0211866 A1 | 9/2007 | Sink |
| 2007/0213088 A1 | 9/2007 | Sink |
| 2007/0218910 A1 | 9/2007 | Hill et al. |
| 2007/0242472 A1 | 10/2007 | Gergets et al. |
| 2007/0250318 A1 | 10/2007 | Waserblat et al. |
| 2008/0036583 A1 | 2/2008 | Canfield |
| 2008/0040110 A1 | 2/2008 | Pereg et al. |
| 2008/0066184 A1 | 3/2008 | Ben-Ami et al. |
| 2008/0079388 A1* | 4/2008 | Sarnowsky ........... H02J 7/0042 320/103 |
| 2008/0144528 A1 | 6/2008 | Graves et al. |
| 2008/0148397 A1 | 6/2008 | Litvin et al. |
| 2008/0152122 A1 | 6/2008 | Idan et al. |
| 2008/0154609 A1 | 6/2008 | Wasserblat et al. |
| 2008/0181417 A1 | 7/2008 | Pereg et al. |
| 2008/0189171 A1 | 8/2008 | Wasserblat |
| 2008/0195385 A1 | 8/2008 | Pereg et al. |
| 2008/0195387 A1 | 8/2008 | Zigel et al. |
| 2008/0228296 A1 | 9/2008 | Eilam et al. |
| 2009/0007263 A1 | 1/2009 | Frenkel et al. |
| 2009/0012826 A1 | 1/2009 | Eilam et al. |
| 2009/0033745 A1 | 2/2009 | Yeredor et al. |
| 2009/0043573 A1 | 2/2009 | Weinberg et al. |
| 2009/0045773 A1* | 2/2009 | Pandya ................ B60L 5/005 320/108 |
| 2009/0096399 A1* | 4/2009 | Chen .................. H01M 10/44 318/441 |
| 2009/0141511 A1 | 6/2009 | Gergets et al. |
| 2009/0167253 A1* | 7/2009 | Muraoka ........... H01M 10/0525 320/152 |

FOREIGN PATENT DOCUMENTS

| | | |
|---|---|---|
| CA | 2433711 A1 | 12/2003 |
| FR | 2 648 665 A1 | 12/1990 |
| WO | WO 98/18652 A1 | 5/1998 |
| WO | WO 00/06420 A1 | 2/2000 |
| WO | WO 00/21053 A1 | 4/2000 |
| WO | WO 00/55825 A1 | 9/2000 |
| WO | WO 03/023729 A1 | 3/2003 |
| WO | WO 03/067884 A1 | 8/2003 |
| WO | WO 2004/010398 A1 | 1/2004 |
| WO | WO 2004/038594 A1 | 5/2004 |
| WO | 2007/117854 A2 | 10/2007 |
| WO | 2008/127016 A1 | 10/2008 |

OTHER PUBLICATIONS

Article entitled: "*Surface Mount LEDs: The Winding Road to Today's Solutions*", Dialight, The Worldwide Leader in LED Technology, Copyright 2005 (4 pages).

Morris, Tom, "*Aluminum Substrates Make Light Work of Visible LED Circuits*", Canadian Electronics Buyer's Guide, Mar. 3, 2006 (2 page).

News Release entitled: "*Substrate Solves Power LED Thermal Problems*", TT Electronics Welwyn Components, Apr. 15, 2004 (2 pages).

Product News entitled: "*Aluminum Substrate PCBs eliminate heatsinks in automotive LED Lighting*", Reed Electronics Group, May 2004 (1 page).

Morris, Tom, "*IRC's Anotherm™ Technology Enables LEDs to Operate at Full Power*", TT electronics, Feb. 15, 2006, ( 3 page).

"Multi Layered Security Framework for Metro-Scale Wi-Fi Networks", A Security White Paper, Tropos Networks (Feb. 2005).

"Network diagnostics: LANQuest announces InterView, the first browser-based proactive network diagnostic center.(Product Announcement)", EDGE: Work-Group Computing Report, v8, p. 28(1)—Feb. 3, 1997.

"New for networks: NetAlarrn 2.0 network monitoring. (Meyers and Associates) (Product Announcment)", Newsbytes, pNEW08060022—Aug. 6, 1991.

"PCS: Ortel announces PCS version of revolutionary Series 5800 Fiberoptic Antennas to provide in-building PCS coverage. New application of fiber-optic technology allows PCS operators to compete with the cellular industry (Personal Communications Network )", EDGE, on & about AT&T, v10, n374, p. 24(1)—Sep. 25, 1995.

"Price-Performance Comparison: 3G and Tropos MetroMesh Architecture", A Technology Whitepaper (Apr. 2004).

"Public Safety and Public Access: Granbury, Texas & Frontier Broadband", A Tropos Networks Case Study (Nov. 2005).

"Public Safety: 4.9 GHz Wireless Mesh Networks for Public Safety and First Responders," Firetide Inc., www.firetide.com (© 2004-2005).

"Senate Approves Nominees for NTIA, NTSB, Saint Lawrence, Seaway, NOAA and USCG", United States Senate Committee on Commerce Science and Transportation, Dec. 11, 2006.

"Senate Govt. Affairs Committee ranking Democrat", Communications Daily Jul. 6, 2004 Document Type: Newsletter.

"Spotwave to Launch Home Indoor Wireless Coverage.(launch of wireless communications equipment by Spotwave Wireless Inc.)", eWeek, NA Mar. 14, 2005.

"Understanding Wi-Fi and WiMAX as Metro-Access Solutions", White Paper, Wi-Fi and WiMax Solutions, Intel Corp. (2004).

"Weather Hazards Assessment", United States Department of Commerce, National Oceanic and Atmospheric Administration, Dec. 28, 2006.

"Wireless LAN in Public Safety, 802.11b: Transforming the Way Public Safety Agencies Transfer Information," brochure, www.northropgrummanIT.com, Northrop Grumman Information Technology (© 2003).

"Wireless LAN Infrastructure Mesh Networks: Capabilities and Benefits: A Farpoint Group White Paper," Document No. FPG 2004-185.1 Farpoint Group (Jul. 2004).

"Wireless world: Ortel announces cutting-edge Series 5800 for in-building cellular coverage using fiber-optic technology. (Product Announcement)", EDGE, on & about AT&T, v10, n341, p. 29(1)—Feb. 6, 1995.

"Wireless: Ortel issued 3 patents for Series 5800 fiberoptics; advanced technology for in-building cellular coverage (Industry Legal Issue)" EDGE on & about AT&T, v10, n379, p. 11(1)—Oct. 30, 1995.

(56) References Cited

OTHER PUBLICATIONS

"WLAN Solutions: TNETW1100B Embedded Single-Chip MAC and Baseband Processor" Texas Instruments Product Bulletin (© 2002).
Abel, Amee Eisenberg, "World Trade Center bombing underscores need for data-loss prevention. (Brief Article)", Computer Shopper, v13, n7, p. 72(1)—Jul. 1993.
Abstract from Dialog of the article for: Bruzewicz, A.J., "Remote Sensing and GIS for Emergency Management" *Proceedings of the First Federal Geographic Technology Conference, Exposition and DataMart* (Sep. 26-28, 1994).
Dong, Pinlian, "Development of a GIS/GPS-based Emergency Response System" (Abstract), *Geomatica*, 59(4), 427-433 (2005).
Abstract from Dialog of the article for: Gadomski, et al, "An Approach to the Intelligent Decision Advisor (IDA) for Emergency Managers" *6th Annual Conference of the International Emergency Management Society* (1999).
Abstract from Dialog of the article for: Gadomski, et al., "Towards Intelligent Decision Support Systems for Emergency Managers: the IDS approach", *International J. of Risk Assessment & Management*, 2(3-4), 224-242 (2001).
Abstract from Dialog of the article for: Gross, "The Design and Management of an International Disaster Information Resource Network (Building an Emergency Lane on the Information Superhighway)," *The International Emergency Management and Engineering Conference 1995* (May 9-12, 1995).
Abstract from Dialog of the article for: Hamit, "Out from R and D: A Net-based Command and Control Virtual Community for Emergency Management", *Advanced Imaging*, 13(2), 81-82 (Feb. 1998).
Abstract from Dialog of the article for: Laben, "Integration of Remote Sensing Data and Geographic Information System Technology for Emergency Managers and Their Applications at the Pacific Disaster Center", *Optical Engineering*, 41(9), 2129-2136 (Sep. 2002).
"Airline Alcohol Restriction Unlikely to Generate Sufficient Support" *Satellite Today*, 4 (138) (Jul. 20, 2001).
"An Introduction to Wireless Mesh Networking" White Paper, Firetide Inc., www.firetide.com (Mar. 2005).
"Broadband Public Safety Data Networks in the 4.9 GHz Band: Potential, Pitfalls & Promise" A Technology Whitepaper, Tropos Networks (Mar. 2004).
"Cisco 3200 Series Wireless and Mobile Router—2.4-GHz and 4.9-GHz Antenna Guide" product reference, Cisco Systems, Inc. (2005).
"Emergency Alert & Notification Solutions for Government and Business" (Homeland Defense Training Conference), Homeland Defense Journal, Jun. 29, 2006.
"Executive Order: Public Alert and Warning System"(Press Release) Jun. 26, 2006.
GSM: Ortel announces GSM & DCS1800 versions of series 5800 for in-building cellular coverage using fiberoptic technology; allows cellular operators to maintain competitive edge by enabiing new services & expanding coverage areas Edge on & About AT&T, v10, n376, p. 39(1), Oct. 9, 1995.
Guide Lightbar Guidance Added to Case 1H Line Successful Farming, 101(2), 40A (Feb. 1, 2003).
"Hot Port™ 4.9 GHz Public Safety Mesh Network" brochure, Firetide Inc., www.firetide.com (2005).
"IWCE—Cimarron Technologies" *Mobile Radio Technology*, 21 (3). (Mar. 1, 2003).
Letter to Bryan Boettger from County of Los Angeles Sheriff's Department Headquarters, Monterey Park, CA (Aug. 14, 2007).
"Metro-Scale Mesh Newtorking with Tropos MetroMesh™ Architecture" A Technology Whitepaper, Tropos Networks (Feb. 2005).
"About NiceVision®", www.nice.com/products/video/nicevision_about.php (Apr. 1, 2009).
Amato, Ivan, "Big Brother Logs On.(increasing surveillance and lack of privacy increases)", Technology Review (Cambridge, Mass.), 104, 7, 59 Sep. 2001.
Antelman, Leonard, "Mixed-signal ICs getting hotter", Electronic Buyers' News, 1992, n. 796. PE 20.

Article entitled "Crist praises work of first responders", article from Ocala Star Banner (Feb. 7, 2006).
Article entitled "*Fight Crime Without Wires: Colorado City's Wireless Network Uses GPRS and Wi-Fi to get Information to Public-Safety Workers Faster*", The Gale Group, Information Week, (Feb. 9, 2004).
Atoji et al., "An Information Filtering Method for Emergency Management," *Electrical Engineering in Japan*, 147(1), pp. 60-69 (Apr. 15, 2004) Abstract from Dialog.
Atoji et al., "An Information Filtering Method for Emergency Management", *Transactions of the Institute of Electrical Engineers of Japan, Part C*, 122-C(10) pp. 1846-1855 (Oct. 2002).
Atoji et al., "Information Filtering Method for Emergency Management", *Proceedings 9th IEEE International Workshop on Robot and Human Interactive Communication*, IEEE RO-MAN 2000 (Cat. No. 00TH8499) pp. 96-100 (2000).
Audeh, Malik, "Metropolitan Scale Wi-Fi Networks", IEEE Computer, pp. 119-121 (Dec. 2004).
Baron, David et al., "Radio Data Broadcast System debuts. (News from CES and MacWorld) (Brief Article)" Digital Media, v2, n8, p. 19(1)—Jan. 18, 1993.
Boomer, Rachel "Test Car Has Perks, Lacks Basics," *Halifax Daily News, Weekly Edition*, B7 (Nov. 12, 1997).
Brambert, Dave, "Get board easily? The newest board game: getting market ownership by owning silicon. (Channel News)", LAN Magazine, v8, n13, p. 240(2)—Dec. 1993.
Briefs—Journal: Computerworld, p. 56, Publication Date: Sep. 30, 1996.
Bulk, Frank—Update: "Wireless Lan Battle Plan—We pitted four top products against one another in a second WLAN competition. As in the first contest, Airespace's entry earned our Editor's Choice award", Network Computing, 51 Feb. 17, 2005.
Calem, Robert E., "Battle of the Networking Stars: Part One—ZigBee and Z-Wave wireless technologies fight for the home", Digital Connect Magazine, 2005, n. 008, p. 35.
Champaign Security System LLC., "The VideoSNITCH Street Sentinel", (2 pages).
Champaign Security System LLC., VideoSNITCH announcement (1 page, Jun. 28, 2004).
Champaign Security Systems, the VideoSNITCH (2 pages, Feb. 8, 2007).
Chevallay, C., et al., "Self-Organization Protocols for Wireless Sensor Networks," 2002 Conference on Sciences and Systems, Princeton University (Mar. 20-22, 2002).
Cohodas, Marilyn J., "Rescue plan. (Federal Emergency Management Agency) (PC Week Executive) (includes related articles on cost savings, walking away from potential disasters)", PC Week, v12 n21, p. E1 (2)—May 29, 1995.
Conner, Margery "Wireless-Sensor Networks: Find a Fit in the Unlicensed Band," EDN, pp. 46-52 (Mar. 16, 2006).
Cox, John , "Switches simplify WLAN deployment", Journal: Network World, p. 1, Publication Date: Apr. 14, 2003.
Cox, John, "Start-up offers high-capacity WLAN gear", Journal: Network World, p. 17, publication Date: Mar. 28, 2005.
Cravotta, Robert, "Charting your course: follow the silicon-breadcrumb trail in this directory to find the perfect device for your project. (The 32nd Annual Microprocessor Directory) (Cover Story)", EDN, 50, 16, 57(11) Aug. 4, 2005.
Curran, Lawrence, "Embedded MCUs/MPUs Weather The Storm—Embedded Processors Are Finding More Diverse Applications, With 32-Bit Devices Building Steam", EBN, 2001, n 1257, p. 55.
Data Sheet entitled "Axis 211/211A Network Cameras—Superior video quality for professional indoor and outdoor applications", Axis Communications (2006).
Data Sheet entitled "Transforming SCADA as you know it", Terra Intelligent RTU, Federal Signal Controls, (2006).
Davis, Stan, "What's your emotional bandwidth? (keeping people's attention in the computer age)(Forbes @ 80) (Industry Trend or Event)", Forbes, v159, n14, p. 233(1) Jul. 7, 1997.
Dees, Tim "The Patrol Video Project," *Law & Order*, 52(7), 92 (Jul. 1, 2004).
DeMaria, Michael J., "Home Smart Home", Network Computing, 2002, n 1301, p. 55.

(56) References Cited

OTHER PUBLICATIONS

DeMaria, Michael J., "Last Line of Defense—Perimeter Security Is Failing Us. Look To A Host-Based Approach to Protect Your Enterprise From Strikes Against Multiple Fronts", Network Computing, 38 Apr. 29, 2004.
Dodge, John, "Hidden VPN Security Costs Are Worth the Price. (Virtual private networks) (Technology Information)" PC Week, v15, n29, p. N29(1)—Jul. 20, 1998.
Douglas, Merrill, "*Bringing CAD Into the Field*", Mobile Radio Technology, vol. 22, No. 11, p. 36, (Nov. 1, 2004).
Dryden, Patrick, "Kaspia automated network management suite gives an early warning of problems", Journal: Computerworld, p. 61, Publication Date: Sep. 9, 1996.
Eckerson, Wayne, "Revolution in the air Wireless options shaking up the voice system market", Journal: NetworkWorld, p. 68, Publication Date: Jun. 15, 1992.
Enriquez, Darryl, "*Wireless System Appeals to Panel: Idea Now Goes to Waukesha Council*", The Milwaukee Journal Sentinel, (Feb. 16, 2006).
Ether WAN Systems Product page regarding "TS900/TS930 Series", unknown date retrieved from http://www.etherwan.com/products.aspx?categoryID=246 on Oct. 11, 2006.
Feit, Edward, "Computer-linked pager improves security, saves Morton money. (Morton International Inc.)", Communications News, v30, n4, p. 24(1) Apr. 1993.
Full Text Article from Dialog entitled: "Department of Energy Improves Emergency Communications Management With SeNTinel WebEOC From CML Emergency Services Inc." PR Newswire , p. 5836 (Aug. 3, 2000).
Full Text Article from Dialog entitled: "Globalstar Develops Wireless Emergency Management Communications System for Disaster Response" *PR Newswire* (Oct. 6, 2005).
Full Text Article from Dialog entitled: "Homeland Security Official Seeks Coherent Wireless Strategy" *Communications Daily* (Dec. 11, 2002).
Full Text Article from Dialog entitled: "National Center for missing & Exploited Children Joins Forces with Nextel, Comlabs, and the Pennsylvania State Police to Develop New Wireless Amber Alert Service" *Business Wire* (Jul. 12, 2004).
Full Text Article from Dialog entitled: "XM Radio and Weather Works to Launch Breakthrough Real-Time Weather Data Service for Aviation, Marine and Emergency Management; Garmin and Heads Up Technologies to Provide State-of-the-Art Receivers" *PR Newswire* (Apr. 7, 2003).
Full Text Article from Dialog entitled: Morrissey, et al., Red Cross to Use Portable LANs to Coordinate Disaster Relief *PC Week*, 5(5), C1 (Feb. 2, 1988).
Full Text Article from Dialog entitled: NexGen City™, Public Safety Wireless Network Provider, Deploys SPECTRUM® INFINITY™; Aprisma Solution Ensures Availability of Data, Voice and Video fro NexGen City's Wireless First Responder Network, *PR Newswire* (Jul. 12, 2004).
Gibbs, Mark, "Bad times are just around the corner Net Results", Journal: Network World, p. 22, Publication Date: Feb. 21, 1994.
Gilsinn, James, D., et al., "Wireless Interfaces for IEEE 1451 Sensor Networks", Sicon '01 Sensors for Industry Conference, Rosemont, IL (Nov. 5-7, 2001).
Gralla, Preston, "How Wireless Works", Second Edition, Only Part 4, Chapters 14, 15, 16, 17, 18 and 19, (© 2006).
Grimes, Brad; "With wireless, it's good to learn from others: agency initiatives offer valuable lessons about technology and security.(technology use by Army)" Government Computer News, 24, 20. 34(1) Jul. 25. 2005.
Hudgins-Bonafield, Christy, et al.; "Where There's Smoke . . . ", Network Computing, 1996, n. 718, p. 22.
Imel, Kathy J., et al., "Understanding wireless Communications in Public Safety", A Guidebook to Technology, Issues, Planning , and Management, First Edition: Mar. 2000; Revised: Aug. 2000; Second Edition: Jan. 2003.
Jacobs, Paula, "How critical is mission-critical? (prioritizing applications and users according to business needs and systems costs) (Enterprise Computing)", HP Professional, v7, n3, p. 36(3)—Mar. 1993.
James, Geoffrey. "The future that never was: seven products that could have changed the industry but didn't", Electronic Business, 31, 12, 46(6) Dec. 2005.
Johnson, Maryfran, "The 12 Beeps of Xmas", Journal: Computerworid, p. 20, Publication Date: Dec. 23, 2002.
Jones, Timothy, "Healthcare Roundup (Buyers Guide)", Teleconnect, 7, 2, 49(1) Feb. 1999.
Knuth, Dean "Wireless LAN Technology in Public Safety," Northrop Grumman Mission Systems (Jun. 2004).
Krochmal, Mo, "You Lead, They Will Follow: Footprints paints a digital map of consumers' trails—New IBM Technology Follows Retail Customers' Footsteps. (Company Business and Marketing)", Computer Reseller News, 69 Feb. 7, 2000.
Lammers, David, "Network-ready home appliances blanket show (intelligent devices linked over networks featured at International Housewares 2000 Tradeshow) (Company Business and Marketing)", Electronic Engineering Times. 24, Jan. 24, 2000.
Latest cabling and wiring products.(News Briefs), Communications News, 37, 6, 44, Jun. 2000.
Lewis, Richard C., "Rhode Island Ready to Launch Statewide Wireless Network" *Houston Chronicle* (Apr. 28, 2006).
Margulius, David L., "IPv6 marches forward—The next-generation Internet Protocol could spark a new generation of embedded and mobile network applications", InfoWorld, 26, 50, 8—Dec. 13, 2004.
Medford, Cassimir, "Changing Fortunes—Vendors Gauge Their Integrator Relationships (Systems/ Network Integration)" Varbusiness, 1993, n 905 , 91.
Miller, Leonard E. "Wireless Technologies and the SAFECOM SoR for Public Safety Communications"*Wireless Communication Technologies Group, Advanced Network Technologies Division, Information Technology Laboratory, National Institute of Standards and Technology*, Gaithersburg, Maryland (2005).
"NICE Systems Launches Three New NiceVision Digital Video and Audio Recording Solutions" NICE Systems Press Release, www.nice.com/news/show_pr.php?id=170 (May 21, 2001).
Paillard, Cedric "Chips square off on Zigbee", Electronic Engineering Times, 2005, n 1365, p. 66.
Patch, Kimberly, et al., "Invasion of the embedded systems", Journal Network World, p. 1, Publication Date: Jun. 8, 1998.
Product page entitled "AutoFind-Mobile License Plate Recognition (LPR)", Auto VU Technologies, retrieved from http://www.autovu.com/website/content/products_autofind.html.
Product page entitled "GPS Vehicle Tracking Units: Shadow Tracker™ 2000", retrieved from http://www.onetrackinc.com/Shadow-Tracker-2000.htm on Oct. 10, 2006.
Project Mesa: an Update, "Making Progress Toward an International PPDR Standard" pp. 1-7 (Sep. 2003).
Rash, Wayne, Security Adviser: Your security tune-up—It's 2003 and already it's time to review existing policies and perform vital status checks, InfoWorld, 25, 3, 26 Jan. 20, 2003.
Results of Google Search performed.
Rigney, Steve, "The network smoke detector . (Kaspia Automated Network Monitoring System 1.1)(Network Edition First Looks) (Software Review)(Evaluation)" PC Magazine, v16, n7, p. NE19(1) Apr. 8, 1997.
Roff, Graham, IEEE 1451 Overview "A Smart Transducer Interface for Sensors and Actuators" (May 13, 2004).
Rossheim, John, "Handwriting-recognition features can make or break pen computing. (Mobile Computing: PC Week Supplement)", PC Week, v10, n15, p. S15(1)—Apr. 19, 1993.
Schurr, Amy, "Protection from infection; anti-virus software is a necessary safeguard for networked, stand-alone PCs, say corporate buyers. (includes related set of tips for avoiding virus-related problems) (PC Week Netweek)", PC Week, v11, n42, p. N3(1), Oct. 24, 1994.
Siemens Building Technologies "MM 8000: Simple and Secure Danger Management" Siemens Switzerland, Ltd. (Jun. 2005).
Siuru, William, "Police Cars go High-Tech" *Popular Electronics*, 1 1 , 59-62 (Aug. 1994).

(56) References Cited

OTHER PUBLICATIONS

Snap shot retrieved from http://www.remingtonelsag.com—Remington ELSAG Law Enforcement Systems, Mobile Plate Hunter.

Storey, Denis "IWCE 2003 Preview" *Mobile Radio Technology*, 21(2) (Feb. 1, 2003).

Success Story: Chicago Police Department, Chicago Police Video Surveillance, Wave, Wireless Corporation, www.wavewireless.com (downloaded Apr. 2006).

SWAP 900, Solar Wireless Access Point, iRDATA Corporation (2006).

SYS Technologies (SYS) Corporate Fact Sheet (Jun. 30, 2006).

Van Dyck, Robert E., "Detection Performance in Self-Organized Wireless Sensor Networks," National institute of Standards and Technology (Jun.-Jul. 2002).

Van Dyck et al., "Distributed Sensor Processing Over an Ad Hoc Wireless Network: Simulation Framework and Performance Criteria," Wireless Communications Technologies Group; National Institute of Standards and Technology (2001).

Wexler, Joanie M., "Mobile Users Just a Beep Away, Start-Up's Win Beep to Extend Reach of Motorola's Alert Central," *Computerworld*, p. 51 (Feb. 22, 1992).

Wiggins, Roberta, "Myths and Realities of Wi-Fi Mesh Networking" Yankee Group Report, Yankee Group Research, Inc. (Feb. 2006).

Wolff, Robert "Better Communication Through Mesh Technology," *Bourbonnais Herald* (Apr. 4, 2006).

Yoshida, Junko, "Buzz surrounds ZigBee as pervasive wireless spec", Electronic Engineering Times, 2001, n 1192, p. 16.

Ziembicki, M., et al., "Hardware random number generator designed for cryptographic systems", Journal: Kwartalnik Elektroniki i Telekomunikacji, vol. 49, No. 4, p. 503-514 Publisher: Polish Scientific Publishers PWN, Publication Date: 2003 Country of Publication: Poland.

Zyskowski, John, "Controlling current events: choosing and uninterruptible power supply or line protector. (includes related articles on UPS add-ons, shutdown software and simple network management protocol) (Buyers Guide)", Computer Shopper, V16, N4, p. 302(15)—Apr. 1996.

Power Point Presentation entitled "Arjent S2/Legend Product Introduction" by Paul Gergets present during telephone interview, May 10, 2007, 25 slides.

Federal Signal Corporation Brochure for "Arjent S2 LED Light Bar"bulletin # 3185, version 306, 4 pages, 2006.

Federal Signal Corporation Brochure for "Raydian S2 Light Bar" Bright New Thinking, Preliminary Draft, #m1037, 2 pages, 2007.

Federal Signal Corporation Brochure for "Legend Light Bar" As Brilliant Inside as it is Outside, #3190, 3 pages, 2007.

Federal Signal Corporation Brochure for "Arjent SL Light Bar" bulletin M1005, version 406 (2007).

Federal Signal Corporation Brochure for "Raydian SL Light Bar" bulletin M1035, version 906 (2006).

Photo of Code 3 Lightbar (Model No. LEDX2100).

Photo of Whelen Lightbar (Model No. SX8BBBB LFL Liberty).

Photo of Arjent S2 Federal Signal Lightbar.

Brochure for Code 3 Public Safety Equipment, Inc., "LED X™ 2100 Light Bar," Installation Operation Manual (2002-2006).

Brochure for "Whelen Edge LFL Liberty Linear-LED-Lightbars" Form LIB0506 (2006).

CADVoice® Fire Station Controls: Visual Indicators and Automated Control of Lights, Doors, and More, retrieved from http://locution.com/products/cadvoice_firestation.htm on Jan. 15, 2007.

Highlighted Features and Benefits, Fire Station Alerting: retrieved from http://comtechcom.net.fireestationalerting/model10_fire_station_alert on Jan. 15, 2007.

Fire Station Alerting & Controls, Firefighter Health and Safety, retrieved from http://firestationalerting.com/index.php?module=ContentExpress on Jan. 15, 2007.

Stallings, William, *Data and Computer Communications*, New York: Macmillan Publishing Company (1985).

European Patent Office, Extended European Search Report in European Patent Application No. 10800494.6 Jan. 23, 2015.

\* cited by examiner

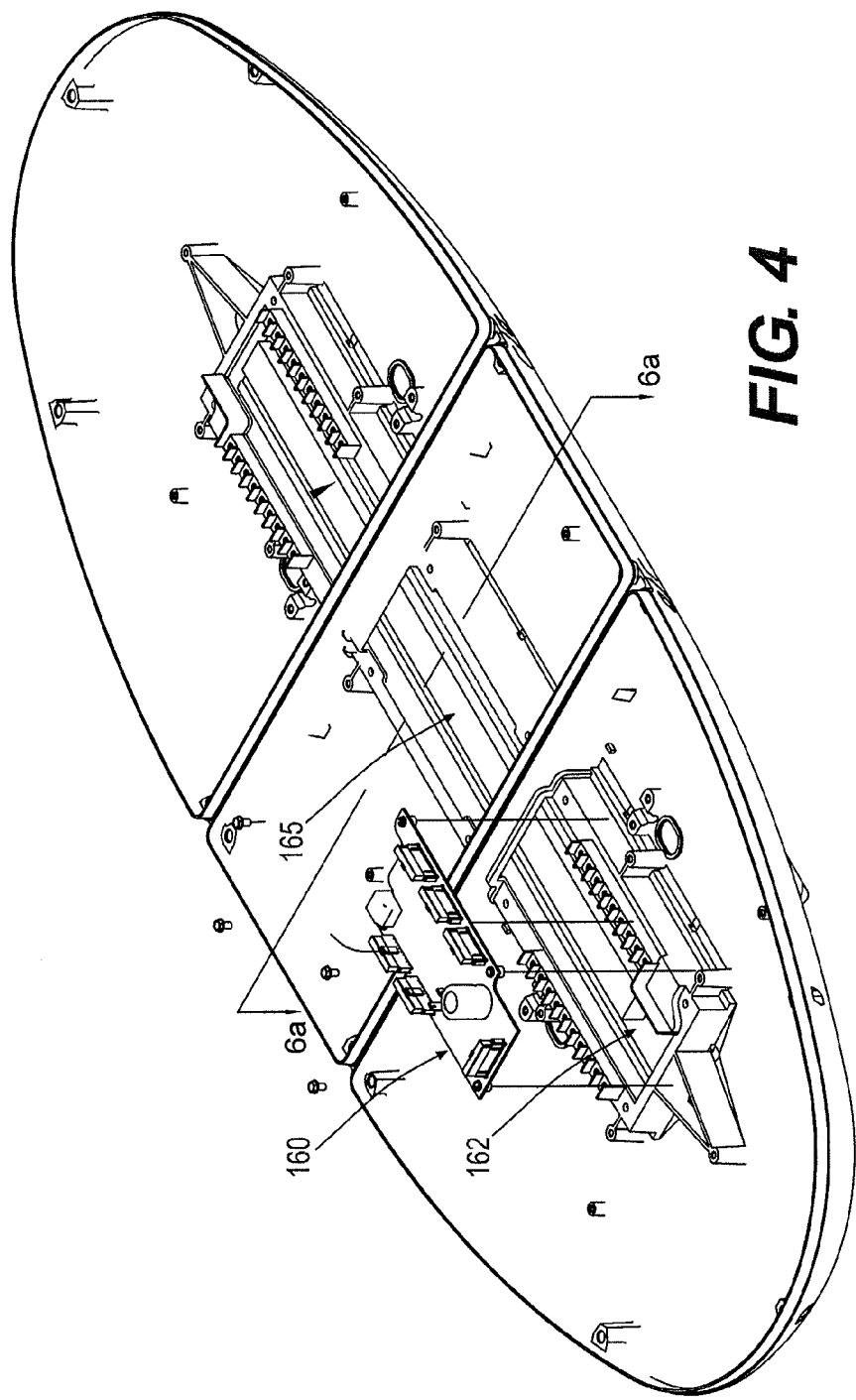

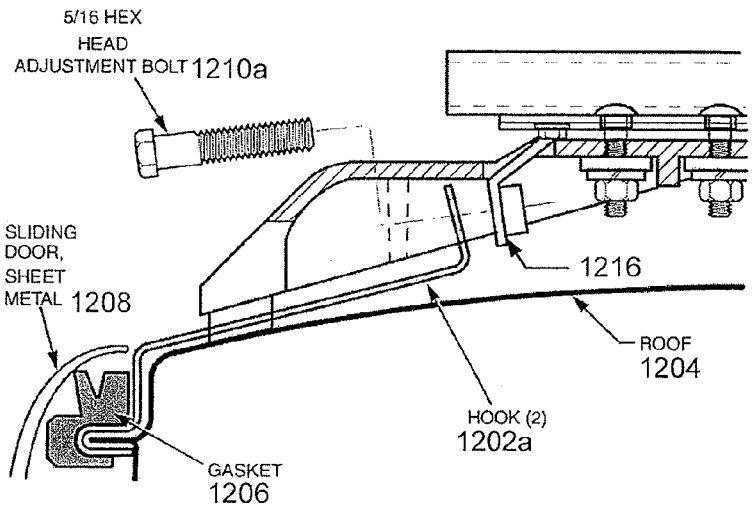
FIG. 5A (Hook mount for vehicles with gutter.)
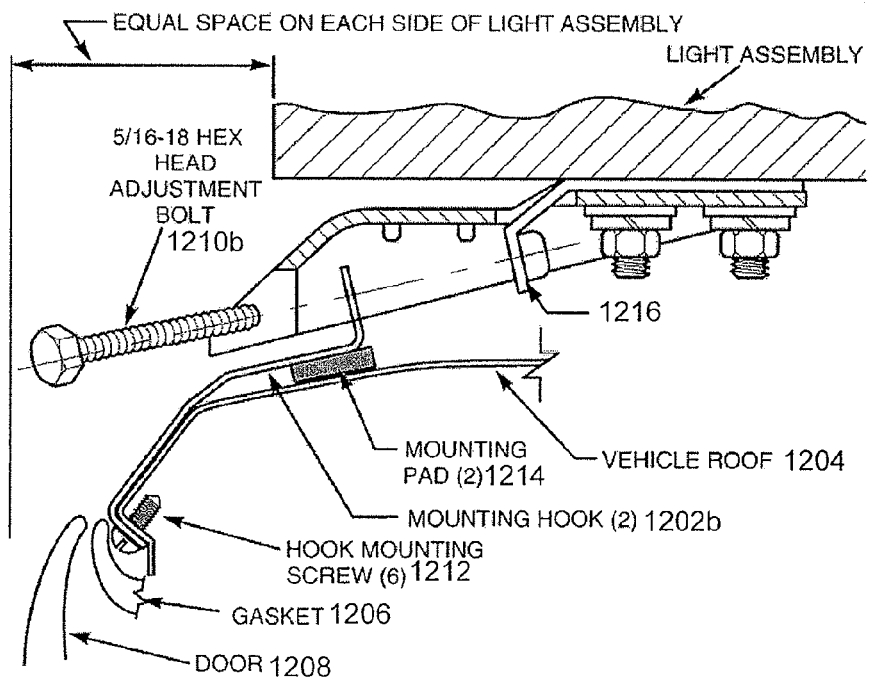
FIG. 5B (Hook mount for vehicles without gutter.)

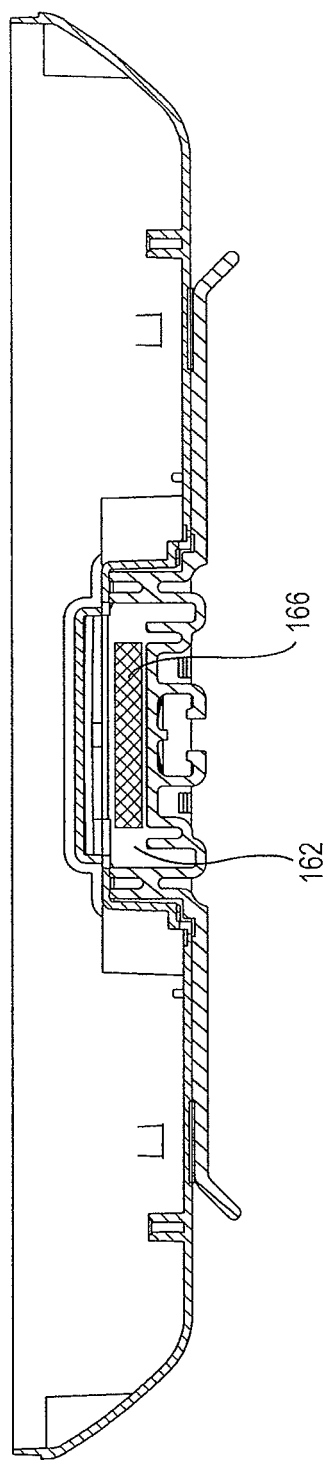

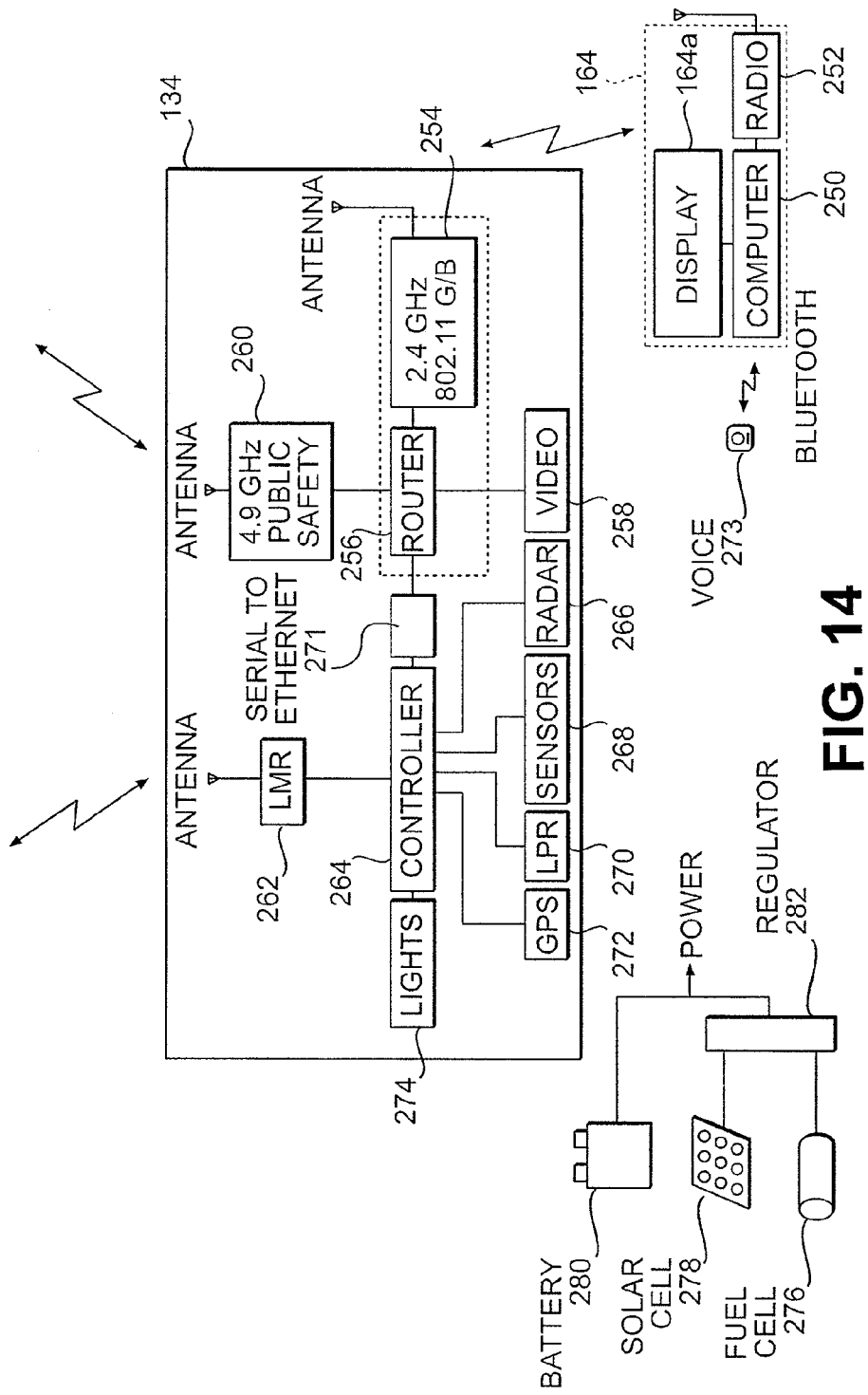

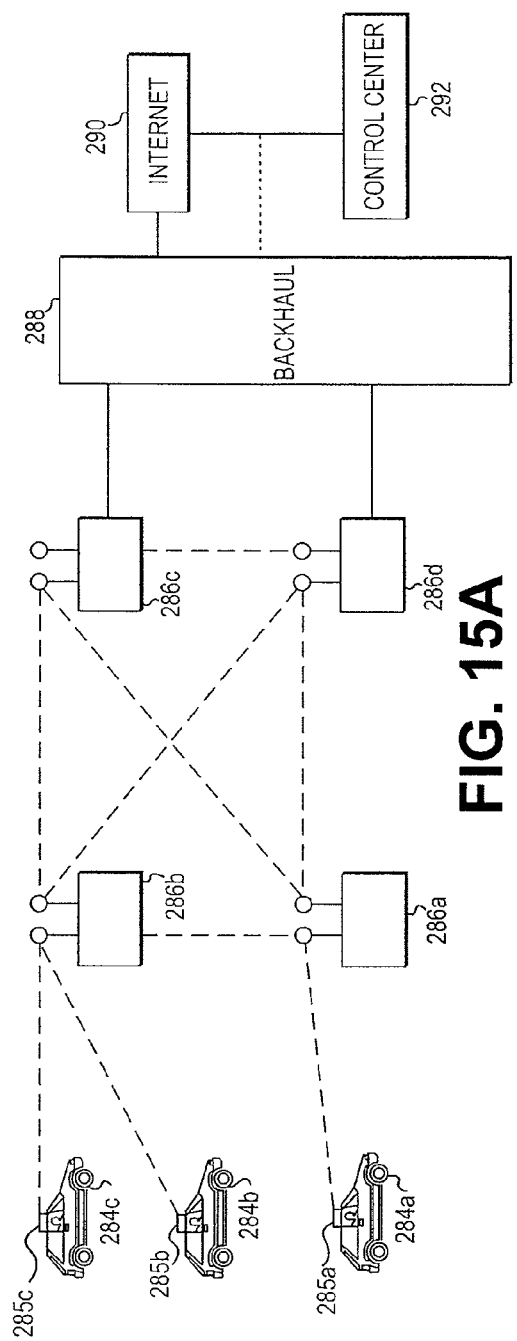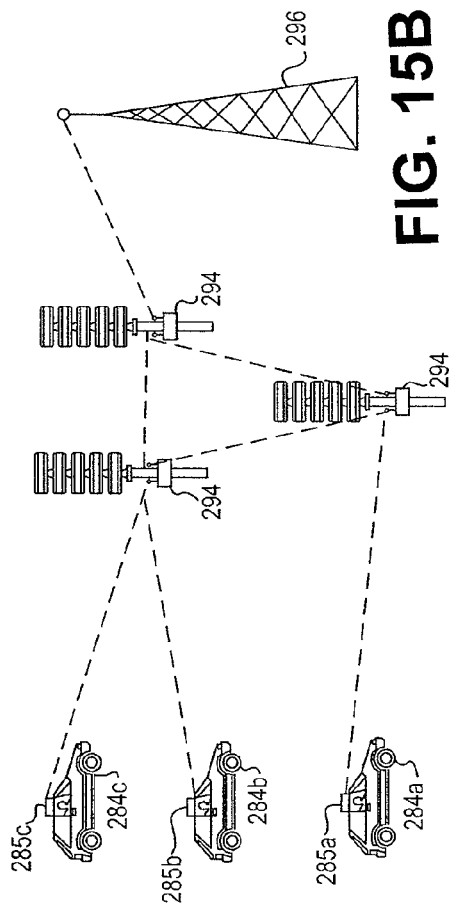

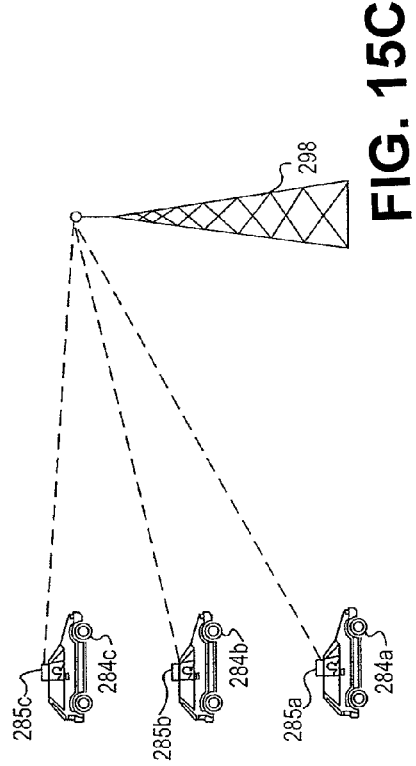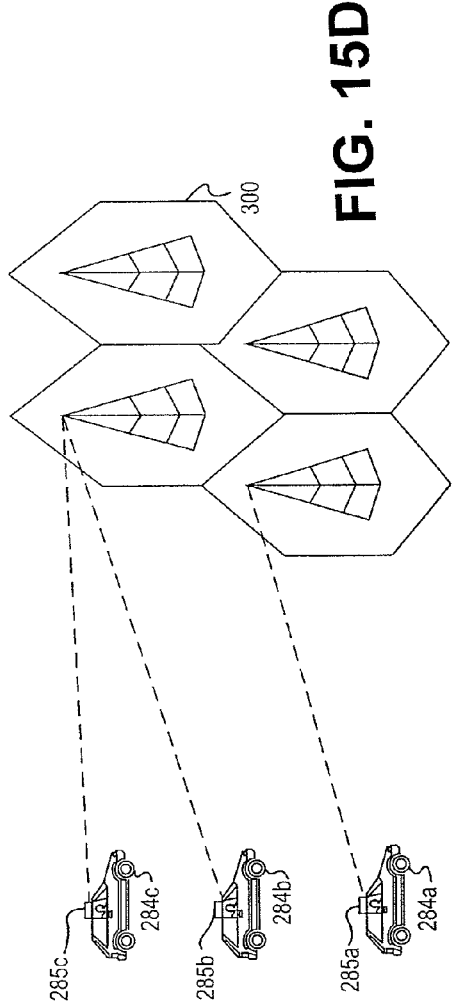

SELF-POWERED LIGHT BAR

CROSS-REFERENCE TO RELATED APPLICATIONS

This application is a continuation of International Patent Application No. PCT/US2010/042002, filed Jul. 14, 2010, which claims the benefit of U.S. Provisional Patent Application No. 61/225,479, filed on Jul. 14, 2009, both of which are hereby incorporated by reference in their entirety.

This application is also a continuation-in-part of co-pending U.S. patent application Ser. No. 13/040,834 filed Mar. 4, 2011, entitled "Light Bar And Method For Making," which is a continuation of U.S. patent application Ser. No. 12/350,506 having the same title filed Jan. 8, 2009 (now U.S. Pat. No. 7,905,640), which is in turn a continuation of U.S. patent application Ser. No. 11/394,752, having the same title and filed on Mar. 31, 2006 (now U.S. Pat. No. 7,476,013). The application and the issued patents are hereby incorporated by reference in their entireties and for everything they describe.

This application is also a continuation-in-part of co-pending U.S. patent application Ser. No. 11/548,209, filed Oct. 10, 2006 entitled "Fully Integrated Light Bar", which is a continuation-in-part of U.S. patent application Ser. No. 11/505,642, filed Aug. 17, 2006, entitled "Integrated Municipal Management Console," (now U.S. Pat. No. 7,746,794), which claims the benefit of U.S. Provisional Patent Application No. 60/775,634 filed Feb. 22, 2006. Both applications and the issued patent are hereby incorporated by reference in their entireties and for everything they describe. U.S. patent application Ser. No. 11/505,642 is also a continuation-in-part of U.S. patent application Ser. No. 11/394,752.

BACKGROUND OF THE INVENTION

Typical emergency response vehicles have many different systems for monitoring and responding to various situations and emergencies. For example, the vehicles are equipped with communications equipment that includes both voice and data generating devices such as radios and computers. This and other electronic equipment (e.g., controls for devices such as light bars) crowd the interior space of the vehicle, which is not designed for this concentration of electronics.

It is extremely difficult to equip the vehicles with all of the needed communications, monitoring, and response equipment. Standard commercial vehicles are retrofitted with this equipment through a labor-intensive process. Retro fitting the vehicles is often an iterative process, as new equipment replaces old. Advances in equipment allow first responders to perform their jobs more safely and efficiently. However, each time equipment advances, vehicles must again be retrofitted. Furthermore, when the vehicle is no longer used by emergency services, the equipment must be removed from the vehicle through another costly, labor-intensive process.

In addition to systems for detecting and responding to emergencies, vehicles must be equipped with various communications systems. For example, in the United States public safety officials including fire departments, police departments and ambulance services primarily use communications systems that work within the VHF and UHF bands. Conventional land mobile radios operate on these and other frequencies. Cellular networks, which operate in the UHF frequency band, are also used for public safety communications systems for both data and voice communications. More recently, the SHF band, such as the 4.9 GHz band reserved by the United States Federal Communications Commission (FCC), have been included in public safety communications systems. Moreover, within these several frequency bands, there are a number of communications standards, such as the IEEE 802.11 protocol, utilized to transmit data. Many other frequency bands and communication protocols are used by emergency service personnel around the country. In order to ensure reliable communications across public safety agencies, vehicles are often now equipped with still further electronics that enable public safety personnel to communicate over several transmissions protocols and/or frequency bands. All of the radios and communications equipment results in a cluttered environment.

As technology evolves and finds applications in the area of public safety, emergency response vehicles increasingly carry more equipment to detect and respond to countless situations and emergencies. Typically, individual systems are installed in the vehicle for each of the tasks aimed at emergency responses. For example, a police vehicle monitors traffic using a radar detector. Cameras mounted in an emergency vehicle gather evidence. Many emergency vehicles have light bars mounted to their roofs. Sirens warn citizens of danger. GPS systems inform a control center of the vehicle's location. Vehicles may contain equipment to detect bio-hazards or chemicals in the event of an industrial spill or terrorist attack. Countless other systems are installed in emergency vehicles based on expected situations. This trend can only be expected to continue.

Emergency vehicles are often equipped with emergency lighting equipment that draw attention to the vehicles and provide visual warning to citizens. Typically this equipment includes flashing or rotating lights, which generating a considerable amount of electromagnetic noise. Because of the noisy environment and to assist in visibility, the emergency lighting equipment is most often housed in a module commonly called a "light bar" mounted to a roof of the emergency vehicle. Installing the emergency light equipment in a light bar lessens the effect the electromagnetic noise has on the operation of sensitive telecommunications equipment inside the vehicle.

Installing in emergency vehicles all of this communications, detection and response equipment is costly and labor intensive. All of it is retrofitted into a vehicle manufactured without any accommodation for this special purpose equipment. Some of the equipment, such as radar units and cameras are typically mounted to the front edge of the interior of the roof such that the radar unit and/or the camera extend downwardly to provide views through the front windshield. Power cables are routed from this equipment to the vehicle's power system through the roof lining and down one of the side posts of the car, separating the front and rear car doors, and then to a controller unit, which is located in the trunk, engine compartment or even under a seat in the interior of the vehicle. Many emergency vehicles are equipped with light bars mounted on the roofs of the vehicles. Power and control cables for the light bars are also fished through the side posts and routed to the trunks of the vehicles or to the engine compartments of the vehicles. These cables are fished through the side pillar of the vehicle separating the front and rear doors. Communications antennas are mounted on the roof and on the trunk. Holes are drilled in the car to attach the antennas. Again, cables are routed to a controller in the trunk of the vehicle. Finally, each piece of equipment is wired to controllers in the vehicle's cabin. There are numerous other systems that are regularly installed in emergency vehicles. As technology advances, new devices must be incorporated into emergency vehicles. This requires taking the vehicle out of service for an extended period of time as older devices are removed from the vehicle and newer devices are installed.

By their nature, emergencies often require deployment of more emergency equipment than normally in use at any given time. Communities must determine how best to provide for emergency situations that may require quick deployment of additional equipment. Typically, communities rely on resources from neighboring communities. This strategy works as long as the neighboring communities are close by and not affected by the same emergency. For emergencies that affect large areas, however, relying on neighboring communities to loan their resources is not a workable strategy.

For example, neighboring communities may face a common emergency such as a hurricane, a terrorist attack or an earthquake. In these types of emergencies, the effected communities will need additional emergency vehicles that are not available from nearby neighboring communities. Moreover, because of the labor intensive and costly installation process, non-emergency vehicles cannot be quickly converted for emergency use. Furthermore, existing emergency vehicles may not have the best combination of equipment for dealing with a particular disaster. The time-consuming installation process prevents vehicles from being quickly adapted to respond to an emergency condition that the vehicle is otherwise not equipped to handle.

After a vehicle is no longer needed by public safety agencies, it is typically sold in the aftermarket. However, all of the communications systems and emergency equipment must be removed from the vehicle before sale. If the vehicle is to be resold at maximum value, the damage to the vehicle done during the process of retrofitting the emergency equipment must be repaired. For example, any holes drilled into the vehicle during installation of the equipment must be patched. The dashboard most likely needs to be repaired because of holes drilled in it to run wiring, mount devices and control units. All of this repairing is expensive and reduces the resale value of the vehicle, which represents a substantial amount of lost revenue to communities.

Another problem facing first responders is the lack of a unified communications network for transmitting voice and data. For example, different police departments responding to the same emergency affecting several communities may use different radios. Furthermore, live video taken from one vehicle at the scene of an emergency is not available to other vehicles responding to the emergency. Current attempts to solve communications problems result in even more equipment and radios being installed into vehicles.

BRIEF SUMMARY OF THE INVENTION

An emergency warning device for mounting to a vehicle has one or more power sources associated with the device and distinct from the vehicle's power sources. In one embodiment, a light bar for mounting to an external surface of the vehicle includes a device for converting solar energy to electrical energy (e.g., solar cells) and a complementary battery for storing the electrical energy for later use by the emergency devices comprising the light bar. The power source for the light bar can be completely self contained in the light bar or it can be supplemented by power from external sources such as the vehicle battery associated with the vehicle's power train.

In one embodiment, the supplemental power alternates with the solar cells and their associated battery to power the emergency warning device (e.g., light bar). In this embodiment, the emergency warning device includes a switch that selects either the battery of the vehicle's power train to power the emergency devices or the combined instantaneous and stored power of the solar cells and battery connected to the solar cells. An energy control system that is either manual or automatic allows energy to be drawn from one or more of the solar cells, battery pack and the vehicle's electrical power system, depending on operating conditions.

In another embodiment, the supplement power source is both an alternative power source and also a source of energy for charging the battery associated with the solar cells. In this embodiment, the battery of the vehicle's power train trickle charges the battery of the emergency warning device. In the course of a vehicle's normal operation, the emergency warning device is typically off for a large portion of the time the vehicle is in use. During that time, the excess energy generated by the power train of the vehicle charges the battery of the device. The alternator of the vehicle, which is the source of power for all of the electrical devices of the vehicle, usually generates more energy than required to power the electrical devices of the vehicle. The excess energy first goes to recharge the battery of the vehicle's power train. Once the battery is fully charged, however, the potential production of energy by the alternator is largely wasted. By using the otherwise wasted potential extra energy to trickle charge the battery associated with the emergency warning device during normal operation of the vehicle, the device can approach a state in which it can operate indefinitely without requiring it be taken out of operation in order to recharge the battery. In one implementation of this embodiment, the supplemental power is aimed at only trickle charging the battery and, therefore, the connection to the warning device can be constructed to handle relatively low power levels, making the connection relatively small and easy to install.

The emergency warning device can include just warning lights or it can include additional devices requiring electrical power that also serve an emergency function. For example, the emergency warning device may house emergency devices such as telecommunications equipment and community monitoring equipment. In one embodiment, all of the emergency equipment that might otherwise be housed in the interior of the vehicle is housed in the light bar so that a vehicle can be easily and quickly retrofitted. Obviously, these devices demand more energy than if the emergency warning device supported only lights. But these device also are unlikely to be operated continuously and, therefore, their inclusion into the emergency warning device may not prevent the device from operating without the need to be periodically taken out of service to charge the battery.

If the battery associated with the emergency warning device is trickle charged, a relatively thin wire can be fished from the a point tapping into the vehicle's electrical system to the device mounted to the exterior of the vehicle. Alternatively, energy can be trickle charged to the device by way of an electromagnetic coupling, making for a completely wireless connection with the vehicle.

For control signals, in order to avoid fishing wiring from a control head mounted in the interior of the vehicle to the equipment in the light bar, the connection between the control head and the light bar is preferably a wireless connection. All wiring is avoided if the emergency warning device either relies exclusively on the solar cells and the associated battery or provides a wireless energy coupling.

In one embodiment of the invention, the emergency warning device or light bar contains a number of modules for sensing real time conditions of the vehicle, its operator and the ambient environment of the vehicle and operator. Example modules include a video camera, a radar unit, a GPS unit, a biological agent sensor and a license plate recognition system. Preferably, the light bar is designed to allow for the custom fitting of modules, thereby enabling a light bar to be equipped with any combination of modules best suited for an application.

In one embodiment of the invention, the light bar houses at least one transceiver for communicating information gathered from sensors (preferably also in the light bar) over a wireless network. In order to enable real time communication of information demanding high data rates, the transceiver is a broadband device such as a Wi-Fi transceiver. Broadband transceivers allow for real time transmission and reception of information such as video feeds and detailed maps of buildings.

In one embodiment of the invention, data from the modules are transmitted over a wireless network to a control center where the data is reviewed and analyzed for activating or informing or otherwise marshalling community resources. Further, information may be transmitted from one fully integrated light bar equipped vehicle to other such vehicles to assist in responding to or monitoring emergencies. These and other embodiments of the invention will be more fully explained in the detailed description of the invention.

BRIEF DESCRIPTION OF THE DRAWINGS

FIG. 4 illustrates a lower portion of a housing for the light bar in FIGS. 2A and 2B including a controller and a fuel cell.

FIGS. 5A and 5B illustrate alternative mounting assemblies for mounting the light bar to a roof of the vehicle.

FIG. 6 is a sectional view of the lower portion of the light bar taken along line 3a-3a in FIG. 4.

FIG. 14 is a schematic diagram of the electronic modules in one embodiment of the light bar.

FIG. 15A is a schematic illustration of a wireless wide area network including a wireless mesh network connecting fully integrated light bars such as those illustrated in FIGS. 1-10 to a control center.

FIG. 15B is a schematic illustration of a wireless wide area network including a wireless mesh network and a wireless point to multipoint network connecting fully integrated light bars such as those illustrated in FIGS. 1-10 to a control center.

FIG. 15C is a schematic illustration of a wireless wide area network including a point to multipoint network connecting fully integrated light bars such as those illustrated in FIGS. 1-10 to a control center.

FIG. 15D is a schematic illustration of a wireless wide area network including a cellular network connecting fully integrated light bars such as those illustrated in FIGS. 1-10 to a control center.

While the following detailed description is made in connection with preferred and alternative embodiments referencing the drawings, the description is not intended to limit the invention to those particular embodiments. On the contrary, the invention is intended to cover all alternatives and equivalents as may be included within the spirit and scope of the invention as defined by the appended claims.

DETAILED DESCRIPTION OF THE INVENTION

The following description is intended to convey the operation of exemplary embodiments of the invention to those skilled in the art. It will be appreciated that this description is intended to aid the reader, not to limit the invention. As such, references to a feature or aspect of the invention are intended to describe a feature or aspect of an embodiment of the invention, not to imply that every embodiment of the invention must have the described characteristic.

Figure 1:
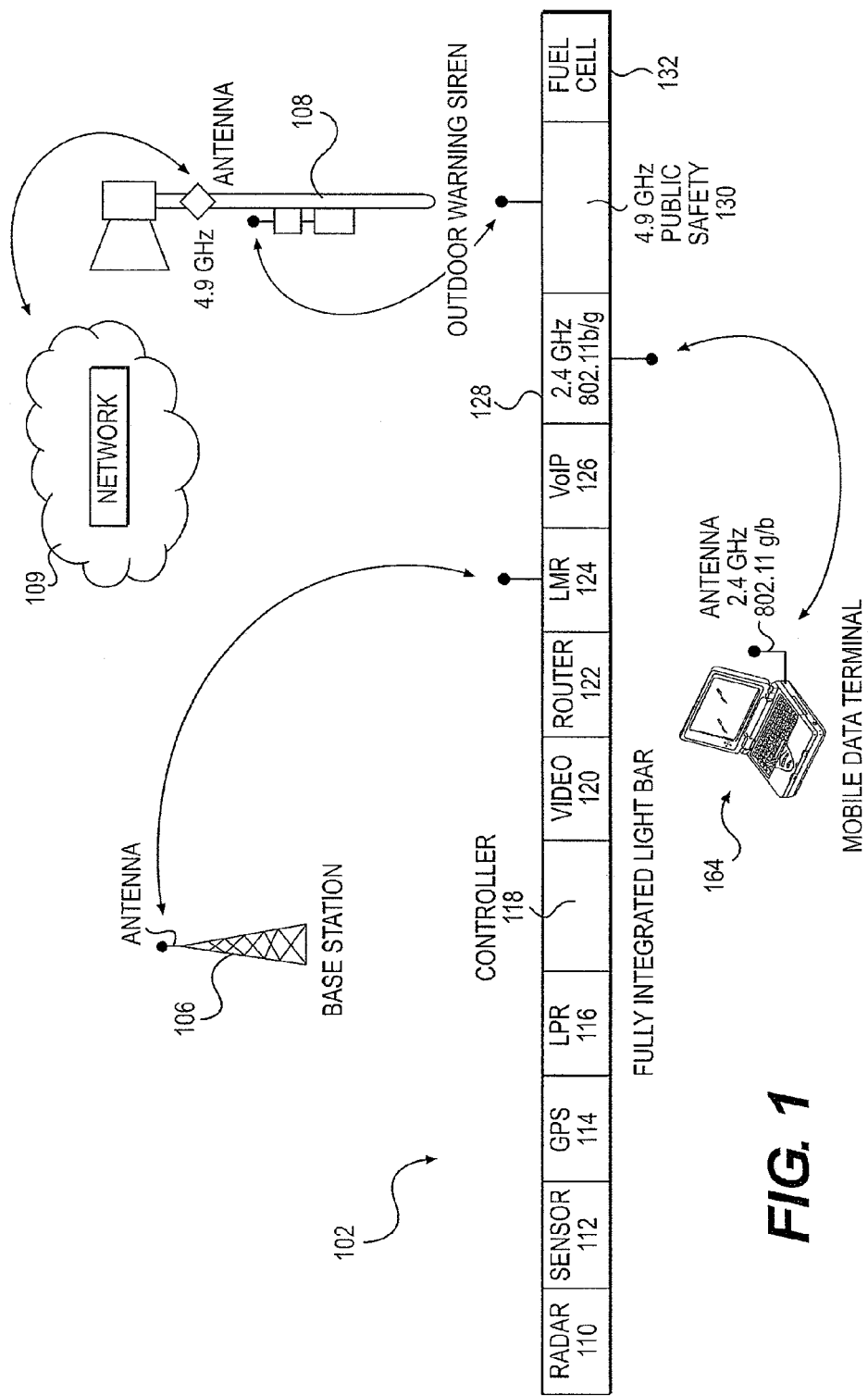
FIG. 1 is a schematic representation of an emergency warning device, such as a light bar, integrated into a broadband community wireless network.

Turning to the drawings and referring first to FIG. 1, an emergency device 102 is in wireless communication with a mobile data terminal 164, a base station 106 and an outdoor warning siren 108. The emergency device 102 contains a number of monitoring, warning and response systems as needed based on its deployment. For example, in one embodiment of the invention, the emergency device 102 is attached to a police vehicle. When it is attached to a police vehicle, the emergency device 102 likely includes modules otherwise located in the vehicles interior spaces. For example, in the illustrated embodiment of FIG. 1, the device includes (1) a video camera 120 for streaming video signals to displays that may be both in the vehicle and at remote locations, (2) a radar unit 110 for detecting the speed of other vehicles, (3) a sensor 112 for detecting the presence of chemical or biological agents, (4) a global positioning system ("GPS") 114 providing the location of the emergency device, and (5) a license plate recognition system ("LPR") 116 providing the license plate number of vehicles in the vicinity. In the illustrated embodiment, each of the modules 110-116 interfaces with a controller 118. Video camera 120 provides video footage (e.g., streaming video) of an area near the emergency device 102. The video camera or module 120 connects to controller 118 or router 122 for routing the video to either an onboard storage or display at the mobile data terminal 164 or routing the video to a remote terminal by way of the base station 106 or a transceiver associated with the outdoor warning siren 108. The outdoor warning siren 108 connects to a wide area network ("WAN") 109. The WAN may be a public network such as the internet or a private network reserved for emergency use. The outdoor warning siren 108 connects directly to the network 109 or connects through a gateway device.

The emergency device 102 also includes several wireless network devices. For example, the emergency device 102 also includes a land mobile radio ("LMR") 124 for communicating with other emergency service personal over a variety of frequencies including the UHF and VHF bands. A voice over Internet Protocol ("VoIP") module 126 of the emergency device 102 allows a user of the device to transmit and receive voice messages over standard data networks such as a network based on the IEEE 802.11 standard. A wireless fidelity ("Wi-Fi") module 128 transmits and receives data over an IEEE 802.11 network. A transceiver 130 implements a public safety radio operating at the 4.9 GHz frequency, which the United States Federal Communication Commission (FCC) has dedicated to public safety applications.

Finally fuel cell 132 of the emergency device 102 provides power for the emergency device 102. Preferably, the fuel cell is incorporated in the emergency device 102 as suggested by the illustration in FIG. 1. By providing a power source within the emergency device 102, the device is fully self contained and can be easily and quickly retrofitted onto any vehicle.

Although FIG. 1 depicts three transceiver modules, the LMR 124, Wi-Fi 128 and the public safety radio 130, one skilled in the art of telecommunications will appreciate that any appropriate wireless standard may be used to enable communication between the emergency device 102 and remote locations. For example, a cellular transceiver for connection to cellular data or voice networks may be included in the emergency device 102. In general, any number of transceiver types may be employed in the emergency device 102. For example, one Wi-Fi transceiver 128 may provide all necessary communication links. Data signals can utilize the Wi-Fi link and voice may pass over the Wi-Fi link using VoIP. On the other hand, a number of specialty transceivers may be employed in the emergency device 102 in order to ensure a more robust communications environment. Embodiments of the emergency device 102 will be more fully described below.

Emergency signaling systems of the type mounted to the roofs of emergency vehicles are commonly called "light bars" because they are typically shaped as bars traversing the roofs of vehicles. In keeping with this convention, in FIG. 2A and FIG. 2B the illustrated emergency signaling system 134 is hereinafter referred to as a "light bar" since it is primarily intended for mounting to the roofs of emergency vehicles such as the roof 136 of the illustrated vehicle 138. However, those skilled in the art of emergency warning device will appreciate that the device described hereinafter as a light bar can take on a variety of shapes and placements throughout a community as the need arises. In one embodiment of the invention, emergency device 102 is integrated into light bar 134 for a vehicle. The emergency device could be mounted to other types of mobile units such as boats and aircraft. Furthermore, the emergency device 102 could also be mounted to stationary objects such as a commercial or residential building in order to convert the building to a temporary emergency command center. In any event, details of the emergency device 102 are set forth below in connection with an embodiment in which the device is the light bar 134 for mounting to the vehicle 138.

Figure 2A:
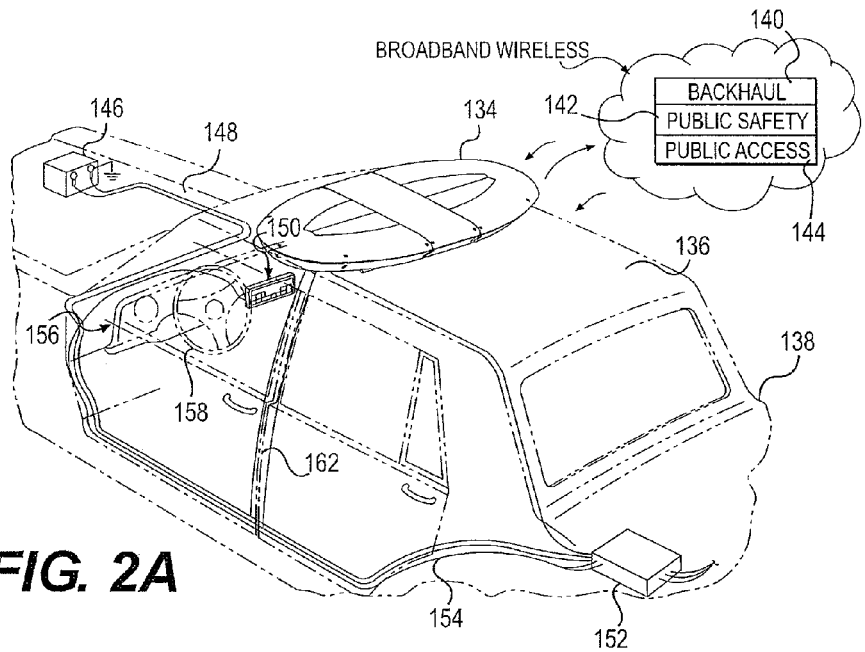
FIGS. 2A and 2B illustrate an emergency warning device of FIG. 1 integrated into a light bar with a wireless connection to a broadband network and a wired or wireless connection to a control head within a vehicle (FIGS. 2A and 2B, respectively).
Figure 2B:
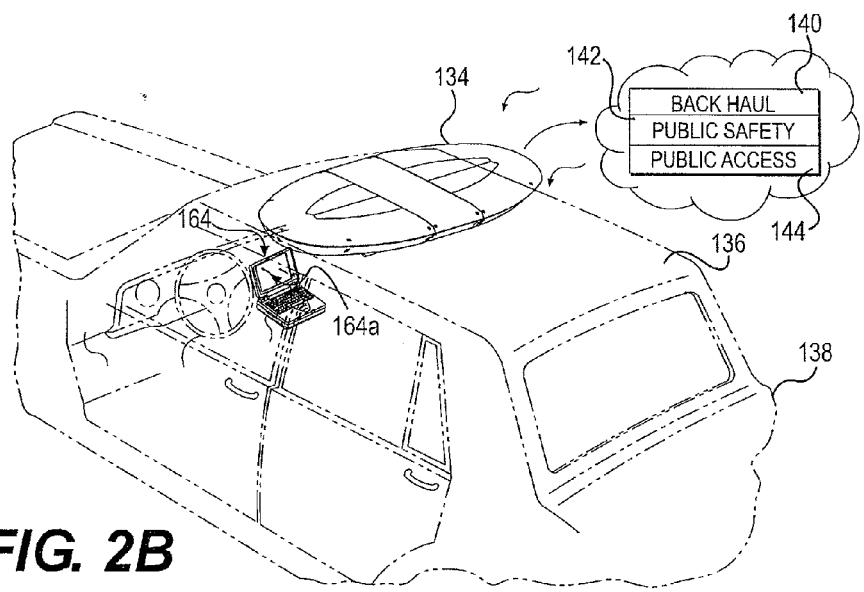

In keeping with one embodiment of the emergency device, the light bar 134 in FIGS. 2A and 2B connects wirelessly to a backhaul network 140, a public safety network 142 and a public access network 144. In FIG. 2A, the light bar 134 is wired to the vehicle's power system 146 through cables 148. A control head 150 in the passenger compartment of the vehicle 138 allows an occupant in the vehicle to control the lights and modules 110-130 in the light bar 134. The control head 150 connects to control unit 152 through wires 154 in order to communicate control signals to the modules 110-130 in the light bar 134. The control unit 152 in the illustrated embodiment provides control functions for other emergency signaling apparatus associated with the vehicle 138. For example, the control unit 152 may also serve a siren. The operator of the vehicle 138 preferably mounts the control head 150 to the dashboard/instrument panel area 156 to the right of the steering wheel 158 for easy access. Although the control unit 152 is depicted mounted in the trunk of the vehicle, it may be mounted elsewhere within the vehicle. For example, control unit 152 may be mounted under the dashboard area 156.

Keystrokes to a keypad incorporated into the control head 150 generate control signals and the control head provides the signals to the control unit 152 by way of cables 154, which in turn communicates signals to the control unit 160 (FIG. 4) within the light bar 134 by way of cable 162. A control system such as Federal Signal's Smart Siren™ system is a suitable example of the illustrated control system for certain embodiments of the invention.

In FIG. 2B, the light bar 134 is in wireless communication with a mobile data terminal ("MDT") 164, enabling the light bar to be completely free of external wiring if the power source (e.g., fuel cell and/or solar cell) is contained in the light bar. The MDT 164 replaces the control head 150 in FIG. 2A and controls the lights and modules 110-130 in the light bar 134. MDT 164 may be a conventional laptop computer equipped with a wireless network interface card (NIC). Preferable as explained hereinafter, the MDT 164 includes a touch screen 164a allowing the user to interact with the light bar by simply touching appropriate areas of the screen as prompted by a user interface displayed on the screen.

Any appropriate wireless standard can be used to connect the MDT 164 and the light bar 134. Examples of appropriate standards include Wi-Fi a, b, g, or n as defined by the Institute of Electrical and Electronics Engineers ("IEEE") in the 802.11 specification. Additionally Bluetooth, Wireless USB or Zigbee, which are all based on IEEE 802.15, can be used as the standard between the MDT 164 and the light bar 134. A user controls the system by entering commands into the MDT 164. Commands are entered into the MDT through any appropriate means including use of a keyboard, touch screen 164a or voice recognition software. Commands entered into the MDT are transmitted to the light bar 134 via the wireless network. The MDT 164 can display information gathered by the modules 110-130 located in the light bar 134. For example, in one embodiment of the invention live video from the video camera 120 is displayed on the screen 164a. Speeds of passing vehicles detected by the radar unit 110 are displayed by the MDT 164. Additionally, the MDT 164 displays the license plates of passing vehicles detected by the LPR 116 module.

Figure 3:
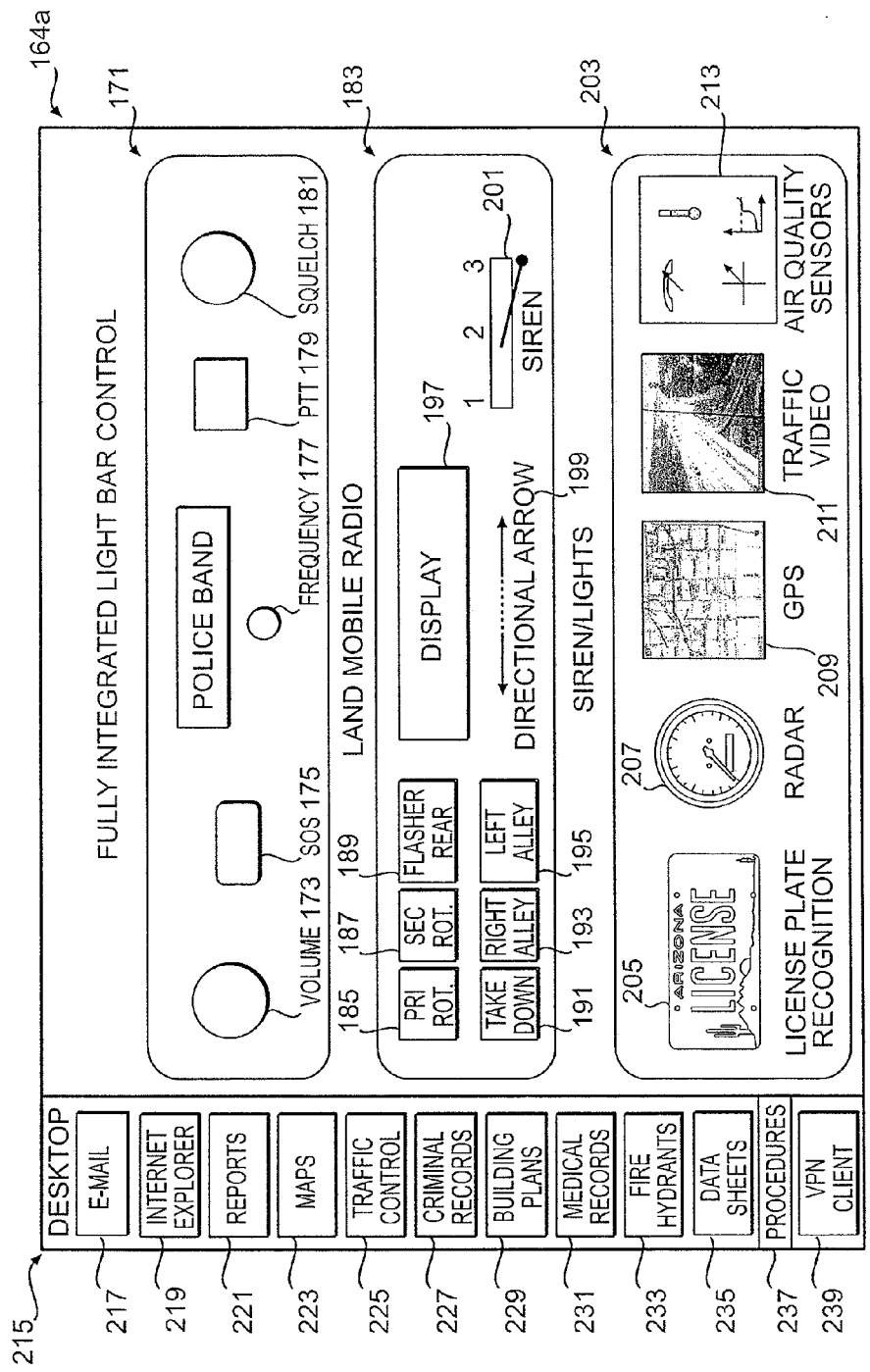
FIG. 3 illustrates a control interface at a mobile data terminal for controlling modules comprising the emergency warning device.

FIG. 3 illustrates one embodiment of the interface for a touch screen 164a integrated into the MDT 164. The touch screen 164a includes a LMR interface 171 that either replaces or is in addition to the standard radio controls already located within the vehicle for communicating with the LMR 124. The interface 171 includes buttons on the touch screen 164a for operating the land mobile radio (LMR) 124 in much the same manner as is accomplished with a conventional, dedicated control head for the LMR that includes mechanical knobs and switches. For example, the user interface 171 provides a volume control 173, a SOS button 175, a frequency control 177, a push to talk control 179 and a squelch button 181.

A light and siren interface 183 controls the light assemblies and siren mounted on a vehicle. The interface 183 includes a primary lights button 185, a secondary lights button 187 and a flasher rear button 189. A take down button 191, right alley button 193 and left alley button 195 operate additional light assemblies. The display 197 indicates the mode that the light assemblies are operating in. Directional control 199 allows the operator to enable flashing directional lighting assemblies. Finally, siren control 201 enables various siren modes.

Module panel 203 displays the current readings for various modules 110-132 housed in the light bar. For example, the license plate recognition system display 205 indicates the license plate number of nearby vehicles. The radar 207 shows the speed of nearby vehicles. The GPS 209 shows a map with nearby emergency vehicles as well as the location of the occupied vehicle. The traffic video 211 shows live video feeds from traffic monitoring cameras located throughout a community. The air quality sensors 213 display information regarding community air quality. Clicking a sensor display expands the display window to a full screen mode. For example, if a user touches the traffic video display 211, it will expand to fill the entire screen.

In another embodiment, the user interface of the touch screen 164a may be similar to the user interface illustrated and described in U.S. patent application Ser. No. 11/505,642, filed Aug. 17, 2006 (now U.S. Pat. No. 7,746,794) and entitled "Integrated Municipal Management Console," which is hereby incorporated by reference in its entirety for everything it describes.

Figure 3A:
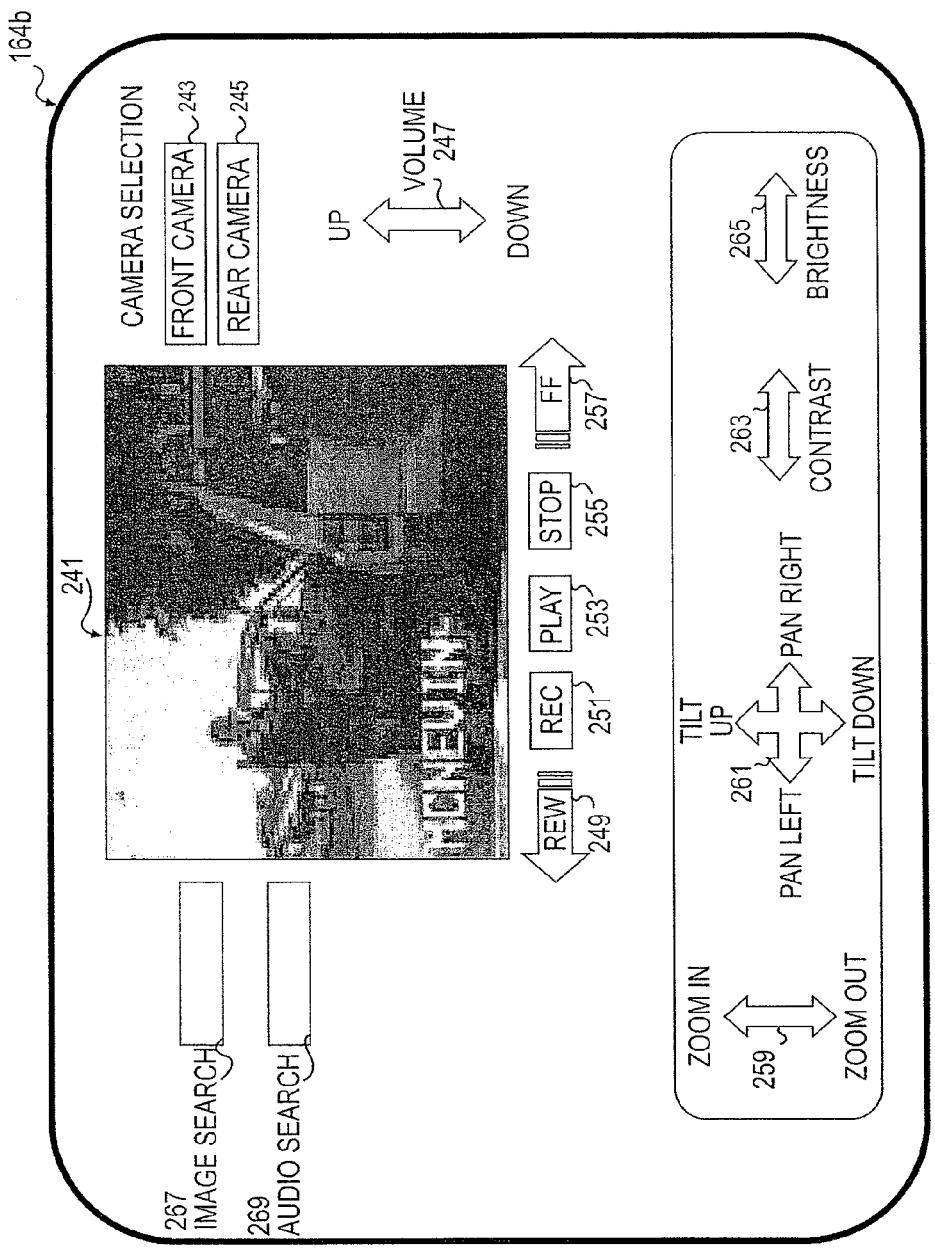
FIG. 3A illustrates a user interface at the mobile data terminal for controlling a video camera mobile of the emergency warning device, where the user interface is accessible from the control interface.

In order to control the devices in the module panel 203 of the user interface 164a, selection of any of the icons 205, 207, 209, 211 and 213 causes a dialog box or window to appear on the touch screen such as the one illustrated in FIG. 3A for the traffic video icon 211. In FIG. 3a, the user interface 164b may be a window or dialog box that appears over the user interface 164a in FIG. 3. Alternatively, the user interface 164b may appear in substitution for the user interface 164a. In either event, the user interface 164b presents to the user various controls for the video camera 120 in FIG. 1. The touch screen interface 164b either replaces or is in addition to standard controls for the video camera 120. The interface 164a includes buttons on the touch screen 164b for operating the video camera 120 in much the same manner as is accomplished with a conventional, dedicated control head for the camera, which includes mechanical knobs and switches. The video display 241 displays a live image from the camera 120 mounted in the emergency device 102 or from remote cameras whose signal is received over the network connection. Additionally, the video display 241 displays recorded images taken by the camera 120 or images recorded by another camera and made available for playback on the display 241.

The user interface 164b contemplates more than one camera 120 in the emergency device 102. In this regard, the user interface 164b includes touch buttons 243 and 245 for selecting front and rear cameras, respectively. A volume control 247 adjusts the audio volume associated with a video. The "rew" touch button 249 rewinds a recorded video segment. The "rec" touch button 251 toggles the record feature of the video camera 120 and MDT 164. The play touch button 253 plays back recorded video. The stop touch button 255 stops video play back. The "FF" touch button 257 fast forwards recorded video. The zoom control 259 zooms in and zooms out of a video image. The pan/tilt control 261 rotates the video image up and down and left and right. The contrast touch button 263 and brightness touch button 265 control the contrast and brightness of the image, respectively. The image search interface 267 and audio search interface 269 allow a user to search for images and audio segments in stored video files.

Returning to the touch screen 164a in FIG. 3, it includes buttons for accessing various computer programs and resources. For example, e-mail button 217 launches a user's email program. Similarly, the Internet Explorer® button 219 launches Microsoft's internet browser. The reports button 221 launches various reports or forms for reports maintained locally or at a remote server. One or more of the broadband wireless connections provides the link to the remote server. Maps button 223 launches mapping software, which presents maps to the user stored either locally or at a remote server. The traffic control button 225 launches a program whose interface enables the user to control traffic intersection lights. Touching the criminal records button 227 launches a program that enables access to criminal records stored either locally or at a remote server. The building plans button 229 gives the user access to databases of building plans for various buildings stored either locally or at a remote server. Similarly, the medical records button 231 allows a user to search databases of medical records maintained either locally or at a remote server. The fire hydrants button 233 launches a program that displays the location of nearby fire hydrants. The virtual private network (VPN) client 239 provides a secure connection over otherwise public networks to the first responder's server to access remote databases containing confidential information such as police records. While the VPN client button may allow for browsing of remote databases, the data sheets button 235 allows a user to search remote data sheets, which may contain information such as details of particular types of chemicals involved in a chemical spill. The procedures button displays procedures 237 for handling situations faced by first responders at a scene of an emergency. For example, a data sheet may provide guidance for dealing with a heart attack victim or how best to react to a water rescue.

Information such as voice and data signals sent over a wide area network ("WAN") and received by one of the transceivers LMR 124, Wi-Fi 128 or public safety 130 can be forwarded to the MDT 164 through the wireless connection between it and the light bar 134. These messages can either be displayed on the MDT's screen or audibly played over speakers either in the vehicle or in the MDT. Messages originating as voice signals can be play directly. Messages originating as data signals can be converted to voice signals by use of commercially available text-to-speech software and played audibly over speakers in the vehicle.

In one embodiment of the emergency device 102, a transceiver sends and receives messages encoded in data packets, an exemplary one of which is illustrated below. The data packet includes a header with information indicating the beginning of a packet. An encryption section contains information related to the encryption of the packet. An address section may contain items such as the emergency device's IP address and MAC address and the packet's destination IP address and MAC address. The data section contains the packet's payload. The payload includes the data to be transmitted. One skilled in the art of communications will recognize that data packets may consist of various fields and are not limited to the specific fields recited. For example, the data format may be TCP/IP based and include IEEE 802.1x compatibility.

| Header | Encryption | Address | Payload |

Figure 7A:
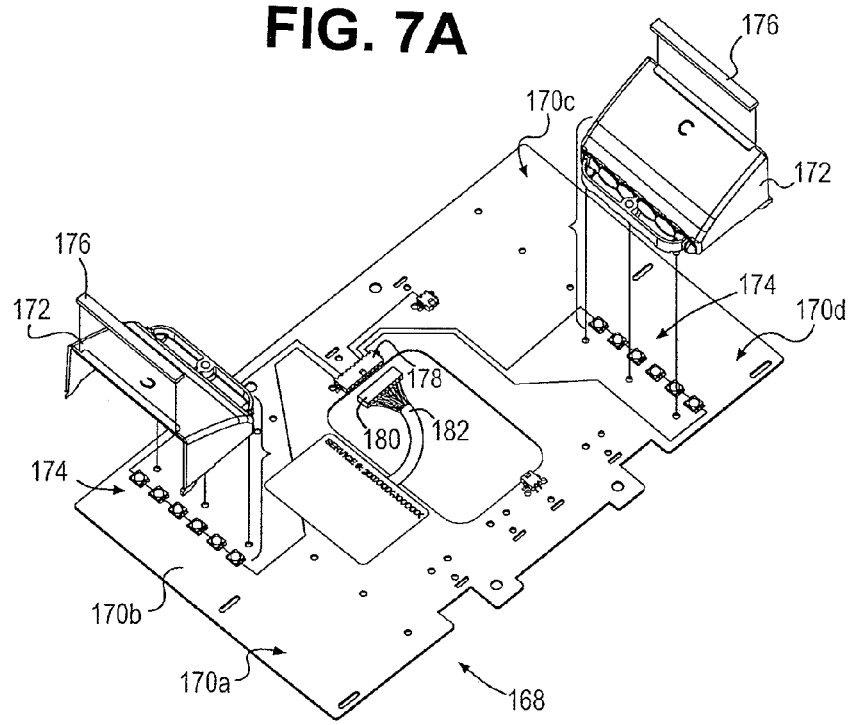
FIG. 7A illustrates one of several circuit boards in the light bar fitted with warning light assemblies.
Figure 7B:
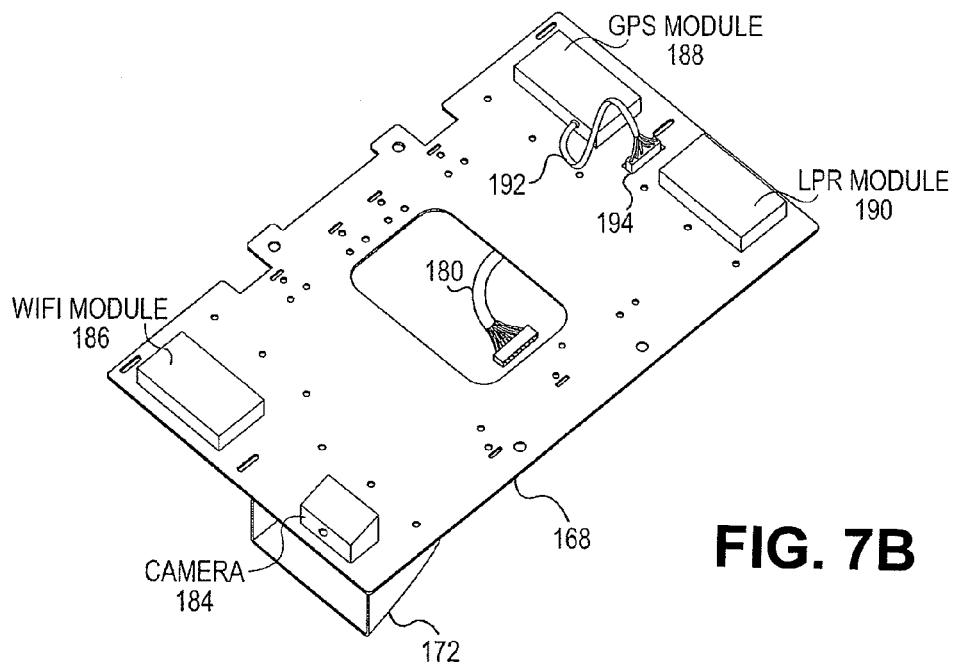
FIG. 7B illustrates the opposite side of the circuit board in FIG. 7A, showing various modules mounted on the circuit board in keeping with one embodiment of the invention.
Figure 8:
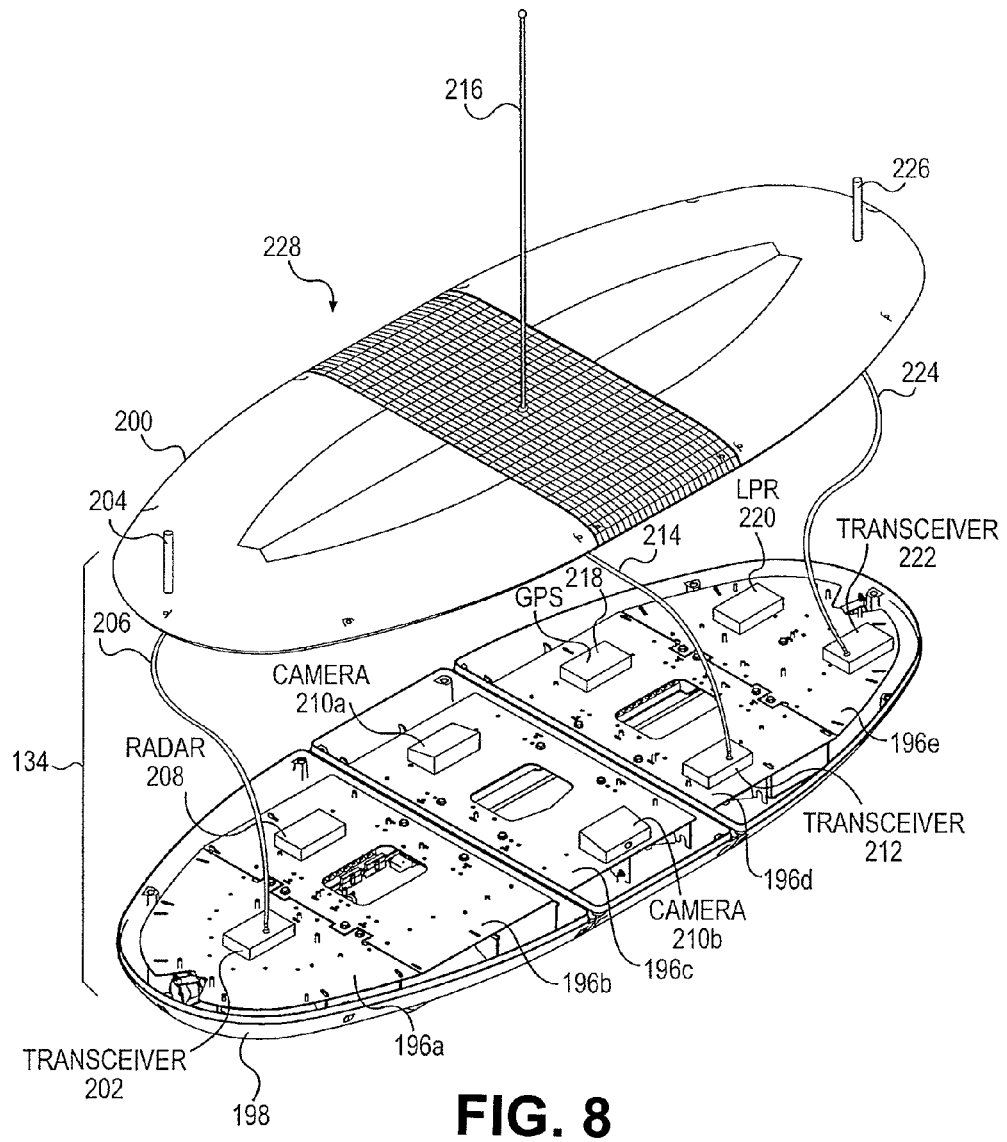
FIG. 8 illustrates an embodiment of the light bar in FIGS. 1-7 with the top half of the light bar's housing exploded away to reveal an interior space of the light bar populated with various electronic modules and antennas supported on circuit boards in keeping with the illustration in FIG. 7B.

FIG. 4 depicts a lower portion of the light bar 134 whose top half is best seen in FIGS. 7 and 8. From the controller 160 in FIG. 4, the operation of the light bar modules are directly controlled in accordance with signals generated at the control head 150 or MDT 164. Installers of the light bar 134 typically strategically place cables 154 and 162 (FIG. 2A) within the interior of the vehicle 138 so they are the least conspicuous and require the least modification of the standard interior features. In this regard, serial connections among the control head 150, the control unit 152 and the controller 160 in the light bar 134 minimizes the number of wires comprising the cables 154 and 162. Each of the two cables 154 and 162 includes two data-carrying wires for bi-directional serial communications. Separate cabling from a battery 146 carries power and reference ground wires to the control units 152 and 160, which in turn deliver the power to the modules in the light bar 134. In an alternative embodiment illustrated in FIG. 2B, the control signals are electromagnetic signals that propagate through the air so that the cables are not needed for controlling the light bar 134. In a further alternative embodiment also illustrated in FIG. 2B, the cables 154 and 162 are entirely eliminated by providing one or more power sources in and/or on the light bar 134.

In the illustrated embodiment, the controller 160 is mounted to the lower housing of the light bar 134. However, the controller 160 can be placed anywhere within or near the light bar 134. The electrical connection between the controller 160 and the modules is described hereinafter in connection with the illustration of FIG. 10. Looking at the lower portion of the light bar 134 depicted in FIG. 4, a channel 162 receives a rechargeable battery at location 165 for providing power to the modules 110-132 and warning lights (e.g., light emitting diodes, strobes and/or halogens) housed within the light bar.

With both a battery and a wireless connection between the light bar 134 and the MDT 164, the light bar is mounted to the vehicle 138 without the need to run any wiring 148, 162 and 154 through the vehicle. Thus, the light bar 134 is easily installed on the roof 136 and the MDT 164 is easily installed in the interior of the vehicle 138.

Various known fastening systems may be used to secure the light bar 134 to the roof 136 of the vehicle 138. For example, Federal Signal Corporation's U.S. Pat. No. 6,966,682 provides one exemplary means of attaching the light bar 134 to the vehicle 138. U.S. Pat. No. 6,966,682 is hereby incorporated by reference in its entirety and for everything that it describes. The MDT 164 can be powered by the battery 146 or it can operate from power provided by a fuel cell or solar panels.

Another exemplary means for fastening the light bar 134 to the vehicle 138 is illustrated in FIGS. 5A and 5B. The light bar 134 is mounted on the roof 136 of the vehicle 138 by means of fasteners such as the illustrated mounting hooks (1202a and 1202b). The light bar 134 can be hook, flat, or permanently mounted on the vehicle roof. FIGS. 5A and 5B illustrate the installation of the light bar 134 on vehicles with and without gutter, respectively. In general, the mounting hook (1202a or 1202b) is provided on each side of the vehicle 138 to affix the light bar 134 onto the vehicle roof. One end section of the mounting hook (1202a or 1202b) is inserted and affixed between the roof gasket 1206 and the roof metal part 1204. In particular, for vehicles with gutters as shown in FIG. 5A, the end section of the mounting hook 1202a is provided with a curve which securely attaches to the gutter of the vehicle roof and is held in place by the gasket 1206. For vehicles without gutter as shown in FIG. 5B, the end section of the mounting hook 1202b is first inserted between the gasket 1206 and the vehicle roof 1204 and held in placed through one or more hook mounting screws 1212.

As further shown in FIGS. 5A and 5B, the body of the mounting hook (1202a or 1202b) has a contour following that of the vehicle roof 136. Mounting pad 1214 may be provided between the mounting hook and the vehicle roof 1204 to provide additional support. As further shown FIGS. 5A and 5B, the other end section of the mounting hook (1202a or 1202b) is raised so that it faces towards a mounting pad 1216 of the light bar 134. A mounting bolt (1210a or 1210b) is then used to secure the light bar 134 through the mounting pad 1216 and the mounting hook (1202a or 1202b).

The location 165 in the channel 162 containing a battery 166 can better be seen in FIG. 6, which is a cross sectional view of FIG. 4 taken along the 5a-5a. In addition to or as an alternative to fuel cells, channel 162 can house a fuel cell for internally powering the light bar lights and modules 110-132. The fuel cell produces electricity from a fuel supply and oxygen. A typical fuel cell uses hydrogen and oxygen as reactants on the anode side and cathode side, although other fuels may be used. Suitable fuel cells are commercially available from a number of companies such as Adaptive Materials, Inc. of Ann Arbor, Mich. and CellTech Power LLC of Westborough, Mass.

In one embodiment of the light bar 134, several, large area circuit boards provide the platform support for the warning lights in the light bar. One of the circuit boards 168 is depicted in FIG. 7A and FIG. 7B. Preferably, the circuit board is composed of a composition that maintains its structural and electrical integrity over the ambient conditions of the light bar 134. In this regard, the light bar 134 is directly exposed to weather conditions in the area it is placed in service, which can include both hot and cold weather extremes. Also, some of the types of the light beam assemblies and modules 110-

132 have attributes that may impose additional requirements on the circuit board. For example, some light beam assemblies produce significant amounts of heat, making the heat sinking capacity of the circuit board an important characteristic. Specifically, light emitting diodes (LEDs) require adequate heat sinking support in order for the LEDs to operate at their greatest efficiency. In addition, some of the modules contain sensitive electronics, which require environments relatively free of electromagnetic interference such as the electromagnetic spray generated by the light modules, power source and other modules in the light bar 134. In addition, the printed circuit board is a structural component in the light bar assembly in that it provides a platform for supporting the modules in addition to the warning light assemblies.

Given the foregoing considerations and requirements, suitable circuit boards for the invention presently available include but are not limited to the following: Fiberglass, phenolic, aluminum (e.g., Berquist boards), steel and ceramic printed circuit board materials. Regardless of the specific composition, the boards need to be structurally robust to environmental conditions that include temperature cycling over an expected wide range that the light bar will be exposed to wherever it is operating. Some specific examples of aluminum products and sources of suitable boards are ELPOR™ by ECA Electronics of Leavenworth, Kans. and Anotherm™ of TT Electronics PLC of Clive House 12-18, Queens Road, Weybridge Surrey KT13 9XB, England. Moreover, conventional fiberglass-based circuit boards may also provide a basic build block for a suitable board. Multi-layered fiberglass boards by M-Wave™ of Bensenville, Ill., U.S.A. can provide the necessary structural strength and they can be fabricated to have the desired thermal properties by incorporating large ground and power planes into the board and multiple "pass throughs" or "vias."

Turning to FIG. 7A, an exemplary embodiment of a circuit board 168 in keeping with the invention includes four areas or stations 170a, 170b, 170c and 170d for fastening light beam assemblies 172 to the board 168. Each of the areas 170a-170d includes connections for various light beam assemblies 172 illustrated in FIG. 7A. One skilled in the art of emergency lighting will recognize that many types of warning light assemblies can be installed on the circuit board. Appropriate examples include, but are not limited to light emitting diodes ("LEDs") and halogen warning light assemblies. Further, the assemblies can be in a fixed orientation or may be capable of oscillating. The warning light assemblies in FIG. 7A include six (6) LEDs collectively identified as 174 and a reflector 176.

The LEDs 174 are laid down on the circuit board 168 as part of the board's fabrication process. In this regard, the circuit board 168 includes conductive paths leading from a connector 178 mounted along an edge of an opening in the board. As discussed in further detail hereinafter, the connector 178 mates with a connector 180 of a cable 182 that has an opposing end connected to the controller 160. The cable 182 carries power and control signals to the board 168. Electrical lead lines in the circuit board 168 carry power and control signals to the electronic components (e.g., drivers) and LEDs 174 and to all other types of light beam assemblies and modules on the circuit board 168.

FIG. 7B illustrates the opposite or second side of board 168 shown in FIG. 7A. Light assembly 172 is visible on the bottom of the board 168. The illustrated embodiment depicts four modules mounted on the board. The video camera 184 provides video surveillance of an area near the light bar 134. For example, the video camera may be an Axis 211 network camera by Axis Communications AB, Emdalavägen 14, SE-223 69, Lund, Sweden. The Wi-Fi transceiver 186 provides wireless network connectivity to IEEE 802.11 compatible networks. An example of the Wi-Fi transceiver is a HotPort 3100/PS, which is a multi-spectrum transceiver capable of operating in the IEEE 802.11 2.4 GHz and 5.0 GHz bands and in the 4.9 GHz public safety band. The HotPort 3100/PS is a wireless mesh network node suitable for broadband data, video, and voice (VoIP) communication. The HotPort 3100/PS is available from Firetide, Inc., 16795 Lark Ave., Suite 200, Los Gatos, Calif. 95032, U.S.A. Appropriate network configurations will be discussed hereinafter with reference to FIG. 12. The GPS unit 188 provides the location of the emergency device 102 as currently depicted in a light bar 134. Appropriate GPS units are available from One Track, Inc. of Phoenix, Ariz., U.S.A. The LPR unit 190 provides the license plate numbers of nearby vehicles. An example of appropriate LPR unit 190 is AutoFind available from Autovu Technologies, Inc. of Montreal, Québec, Canada.

A wide variety of modules can be mounted on the board 168 in various configurations in order to perform monitoring and response activities. The cable 180 provides control signals, data signals and power from the controller 160 for the modules 184-190. Each of the modules 184-190 can be soldered directly to the board 168, or may be fitted with a plug that is received by a socket on the board. By constructing the modules and circuit board 168 with a plug and socket arrangement, the combinations of modules in the light bar 134 are variable and amenable to customization to fit any desired configuration. In fact, for a fully integrated light bar 134 in which the power supply is contained in the light bar, any combination of modules can be easily and quickly placed into the circuit board 168 and the light bar attached to a vehicle so as to provide a light bar that best serves the requirements of a particular emergency condition requiring the vehicle to be retrofitted and put into emergency service.

The electrical connections from a module to the board 168 may be made through the socket, by direct connection or through use of a cable. For example the Wi-Fi module 186 is depicted with a direct connection to the board 168. In contrast, the GPS module 188 is depicted connecting to the board 168 via a cable 192 connected to a plug 194 on the circuit board. In general, each of the modules can use any appropriate connection method of connecting to the board. Additionally, modules do not have to be mounted to a board 168 at all, but may be mounted directly to the light bar 134. Finally, the emergency device 102, comprising various modules 110-132, does not have to take the form of a light bar. For example, the emergency device 102 may be built into a body of a vehicle designed for emergency services such as fire trucks and ambulances. The device may be in an undercover police vehicle. Other public service vehicles such as street sweepers may also incorporate the emergency device 102. Still further, the device can be integrated in to stationary platforms such as emergency sirens mounted to poles distributed through a community. The devices may also be equipped with portable platforms that allow the devices to be deployed as needed for any special circumstances.

Figure 9:
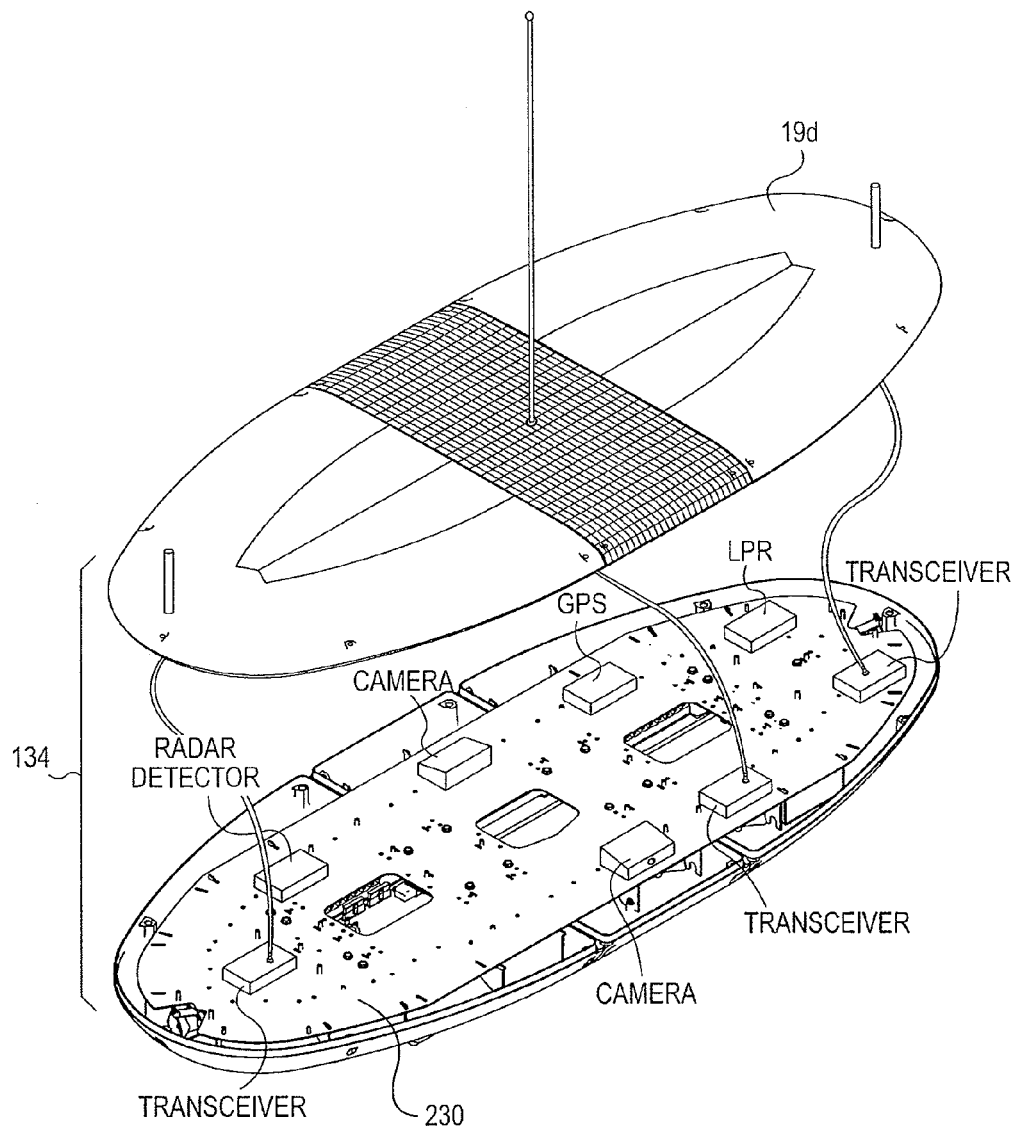
FIG. 9 illustrates an alternative embodiment of the light bar in FIGS. 1-7 with the top half of the light bar's housing exploded away as in FIG. 8 to reveal an interior space of the light bar populated with various electronic modules and antennas supported on a single monolithic circuit board.

In the fully populated light bar 134 depicted in FIG. 8, the lower housing 198 of the light bar houses five (5) circuit boards 196a, 196b, 196c, 196d and 196e of the type illustrated in FIGS. 7A and 7B. The upper housing 200 is exploded away from the lower housing 198 in order to show the circuit boards mounted to the interior of the light bar 134. The light assemblies 172 are mounted on the underside of the circuit boards 196a-196e and are thus in the lower housing of the light bar. The transceiver module 202 mounted on circuit board 196a provides wireless communications with a network such as a Wi-Fi network typically running at 2.4 GHz or 5 GHz. The transceiver 202 connects with antenna 204 thru cable 206 in order to broadcast and receive messages. In the illustrated embodiment, the antenna 204 is mounted to the housing of the light bar. However, the antenna 204 may alternatively be mounted to the circuit board and either fully enclosed within the housing or extending through a hole in the housing that includes a water tight seal. The radar module 208 provides the speed of nearby vehicles. Camera modules 210*a* and 210*b* provide video surveillance facing the front and rear of the light bar 134. A second transceiver 212 acts as the land mobile radio (LMR). Cable 214 connects the transceiver 212 with the antenna 216. GPS module 218 provides location information. LPR 220 provides the license plate number of nearby vehicles. Transceiver 222 connects to the public safety network, typically running at 4.9 GHz. The cable 224 connects the transceiver 222 to its associated antenna 226. Each of the modules connects to its associated circuit board thru either a direct connection or a cable 192. The circuit boards may connect directly to one another or may connect to the controller 160 through use of a cable 180. Any number or combination of modules may be utilized by embodiments of the light bar 134, depending on expected uses of the emergency device 102. Further, the modules depicted in FIG. 8 can be oriented in a variety of ways within the light bar 134 and the particular layout depicted in the figure represents only one embodiment. Referring to FIG. 9, in an alternative embodiment of the light bar 134 the circuit boards 196*a*-196*e* in the embodiment of FIG. 8 are replaced with a single board 230. The circuit board 230 in FIG. 9 provides similar functionality to the circuit boards 196*a*-196*e* in FIG. 8. Like the multiple boards of the embodiment in FIG. 8, the ground plane of the board 230 separates the interior space of the light bar into top and bottom sections. The electromagnetically noisy warning lights are contained in the bottom section of the light bar and substantially electromagnetically isolated by the ground plane from the sensitive modules mounted on the top surface of the board facing the top section of the interior space of the light bar.

In yet another embodiment of the light bar 134, the upper housing 200 includes a solar panel 228 for providing power to the electrical device in the light bar. The solar panel 228 can be integrated into the upper housing 200 or separately attached to the housing. The solar panel 228 directly provides power to the light bar 134 or alternatively it works in conjunction with the battery 165. If a fuel cell is included as one of the power sources, the solar panel powers electrolyzers for hydrogen production. The hydrogen is then used as a fuel for the fuel cell. Power sources for the light bar 134 will be more fully described hereinafter.

Electromagnetic interference ("EMI") is caused by changes to electrical signals. EMI can induce unwanted electrical signals in other circuits, which are commonly referred to as noise. Rapidly changing signals produce EMI in frequency regions that potentially are in the same frequency domain as desired communications and data signals. Additionally, higher power signals produce stronger EMI. Physically moving sensitive circuitry away from sources of EMI tends to mitigate the effect of the EMI on the circuitry. However, with the electrical modules integrated into the light bar 134, these circuits do not benefit from the attenuation of the EMI brought about by the physically distance from the EMI source. Warning lights quickly turning on and off, electric motors and high power requirements all contribute to EMI. Sensitive electronics do not operate efficiently in the presence of EMI. For example, digital clock speeds must be reduced in order to ensure proper operation of circuits. Transceivers loose both data range and data rate because of EMI.

Figure 10A:
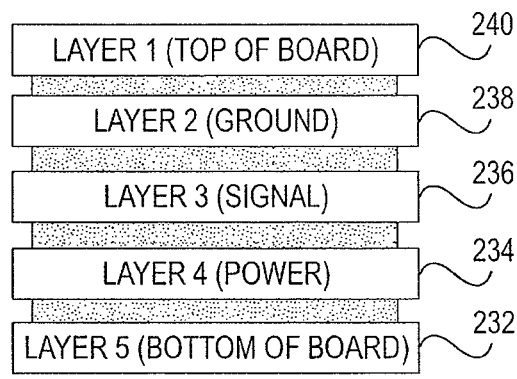
FIG. 10A illustrates a cross sectional view of a circuit board suitable for use as the circuit board in FIGS. 8 and 9 whose ground plane when placed in the light bar creates an area within the light bar that is relatively free of stray electromagnetic radiation from the operation of the warning lights.
Figure 10B:
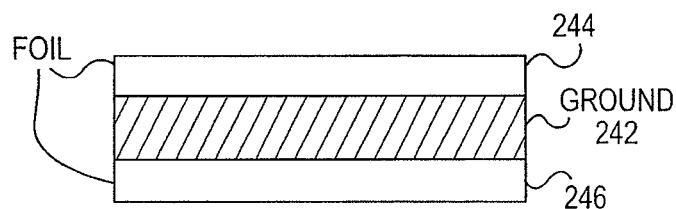
FIG. 10B illustrates a cross sectional view of an alternative circuit board also suitable for use as the circuit board in FIGS. 8 and 9 whose ground plane when placed in the light bar creates an area within the light bar that is relatively free of stray electromagnetic radiation from the operation of the warning lights.
Figure 10C:
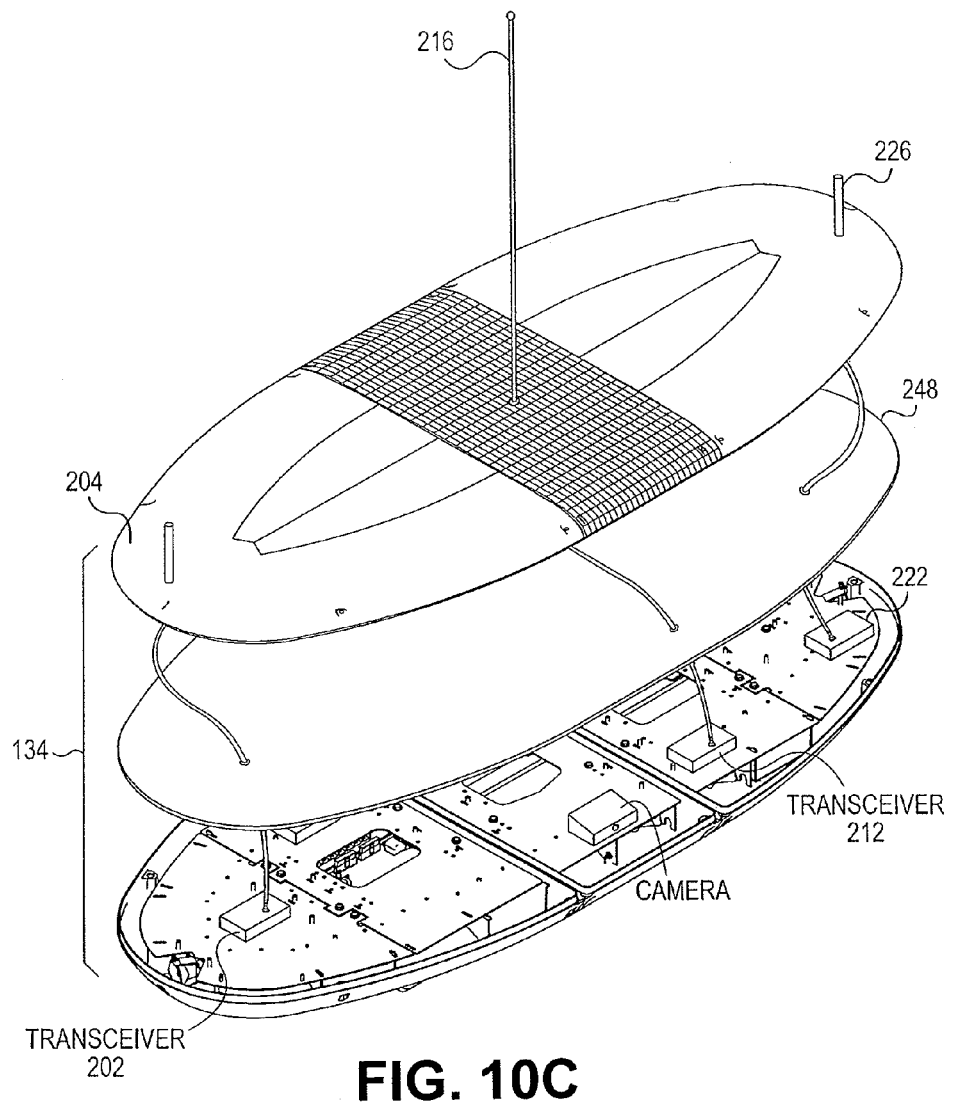
FIG. 10C illustrates an embodiment of the light bar in FIGS. 1-7 where a grounding plane within a light bar and separate from the circuit board(s) for supporting the warning lights provides isolation from the electromagnetic spray of the warning lights.

FIG. 10A, FIG. 10B and FIG. 10C show appropriate methods of minimizing EMI within the light bar 134. FIGS. 10A-10C illustrate three alternative shielding methods for creating an electromagnetically quite area in the top section of the light bar, which is hospitable to the electronic modules. FIGS. 10A and 10B illustrate ground planes in circuit boards that function to create an upper section of the light bar 134 that is substantially isolated from the EMI generated from the warning lights in the bottom section. The circuit boards can be made with various materials. One common material is Flame Resistant 4 ("FR-4"). FR-4 is a fiberglass material with a resin epoxy. FIGS. 10A and 10B show the construction of two alternative boards for the light bar 134 illustrated in FIGS. 1-9.

The board in FIG. 10A is made of FR-4 material, but other board materials may be used. In the illustrated board of FIG. 10A, there are five (5) layers with layer 5 representing the bottom of the board on which the warning light assemblies 172 and LEDs 174 are mounted. Any additional components needed by the light assemblies and LEDs, such as resisters and capacitors and the necessary board traces are on layer 5. Layer 4 contains the power plain. The power plane can contain both digital and analog islands as needed to minimize noise. Layer 3 is the signal plane. The signal plane is isolated from the warning light assemblies 172 by the power plane 234. Further, the signal plane is isolated from the modules 110-132 mounted on the top of the board by the ground plane in layer 2. Thus, inherently sensitive, high-speed signals can be routed on layer 3 and shielded from noisy components on the top and bottom of the board. Layer 1 is the top of the board where the modules 110-132 are mounted. Many of the modules require a relative quiet EMI environment. For example, EMI can result in the radar unit 110 returning incorrect speeds for passing vehicles. The video recorder 120 may not record a clean image if excessive EMI is present. Finally, the transceivers 124, 128 and 130 need a quiet EMI environment to maximize both their range and data rate. The ground plane in layer 2 238 provides necessary isolation for the modules 110-132 without the need to additional shielding.

FIG. 10B represents the cross sectional view of a board made of Anotherm™ by TT Electronics PLC. The board material 242 acts as a natural ground plane. Therefore, the modules 110-132 mounted on the top of the board 244 are isolated from the light assemblies 172 mounted on the bottom of the board 246.

FIG. 10C illustrates an additional or alternative grounded shielding plane 248 for the modules, particularly antennas 204, 216 and 226 connected to the transceivers 202, 212 and 222. The grounded shielding plane 248 may be required as additional grounding for the antennas depending on the specific configuration of warning light assemblies 172 and modules 110-132. The ground plane 248 should be made of a conductive material and for the best isolation, the plane should substantially cover the surface of the circuit boards 196*a*-196*e*. Other methods of minimizing interference due to EMI can be utilized. For example, electrical filtering such as high/low pass filters may be added. The modules most sensitive to EMI may be housed or wrapped in grounded shielding. The most sensitive electronic devices can also be physically located as far apart as possible from the noisiest sources of EMI.

Figure 11:
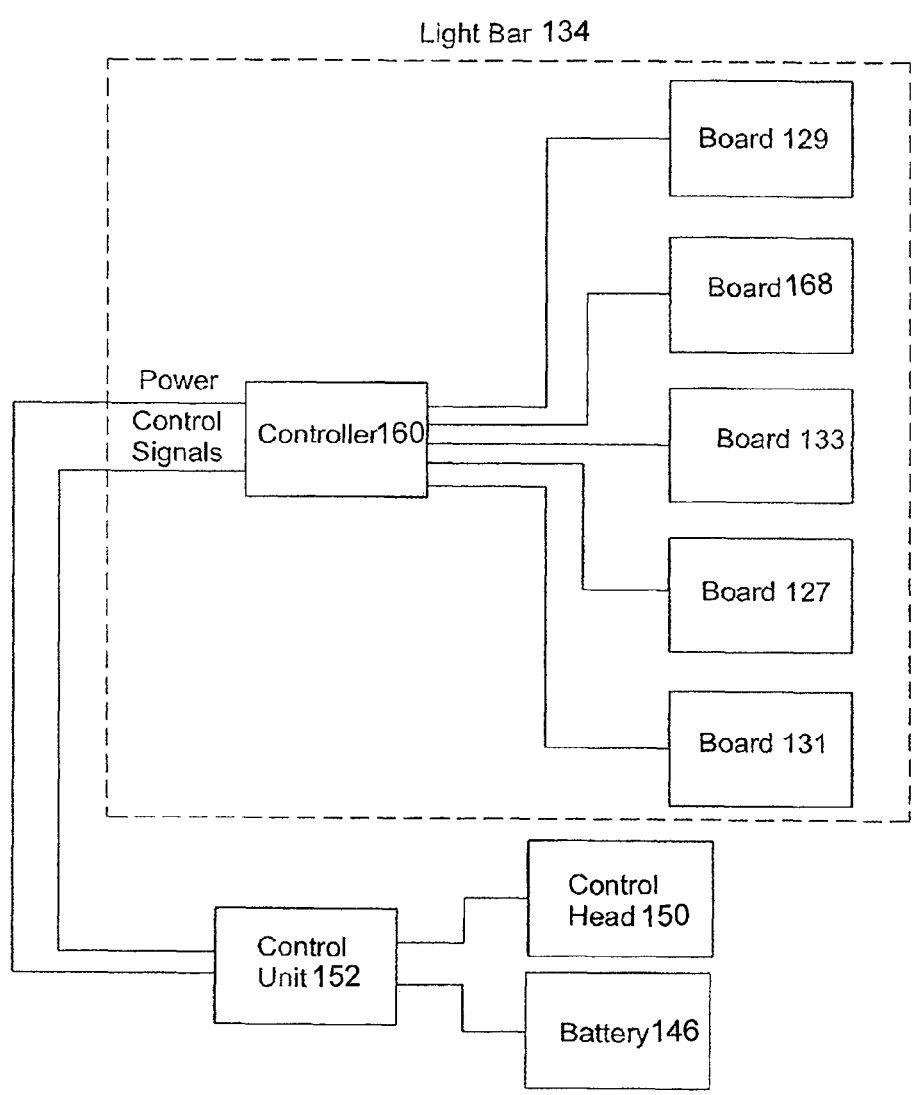
FIG. 11 is a schematic diagram illustrating the electrical connections between the controller and the circuit boards in FIG. 8.

Referring to FIG. 11, each of the circuit boards 127, 129, 131 and 133 includes a connector substantially like the connector 178 of circuit board 168 in FIG. 7 that mates to a connector 180 of a cable 182 communicating power and control signals to the circuit board. As best seen in FIG. 4, the circuit board of the controller 160 includes a connector for coupling to a cable from each of the circuit boards 168, 127, 129, 131 and 133 that are populated with light beam assemblies. Thus, the circuit board for the controller 160 includes five connectors for coupling to five cables from the five circuit boards 168, 127, 129, 131 and 133. A sixth connector on the circuit board of the controller 160 connects to a cable from the control unit 152 that delivers power and control signals to the light bar 134.

Referring to FIG. 11, the controller 160 interprets a serial stream of input data generated by keystrokes to the keyboard of the control head 150. The serial data includes information identifying one of several available flash patterns for one or more of the light beam assemblies. The flash patterns are stored as data in a memory in the controller 160.

The RS485 transceiver sends and receives balanced, digital signals through the RJ45 connector. The transceiver takes the difference of the received signals and passes the result to the main microcontroller and the Signalmaster™ microcontroller in the form of a single ended digital data stream. The Signalmaster™ microcontroller is a product of Federal Signal Corporation of Oak Brook, Ill., U.S.A.

Figure 12:
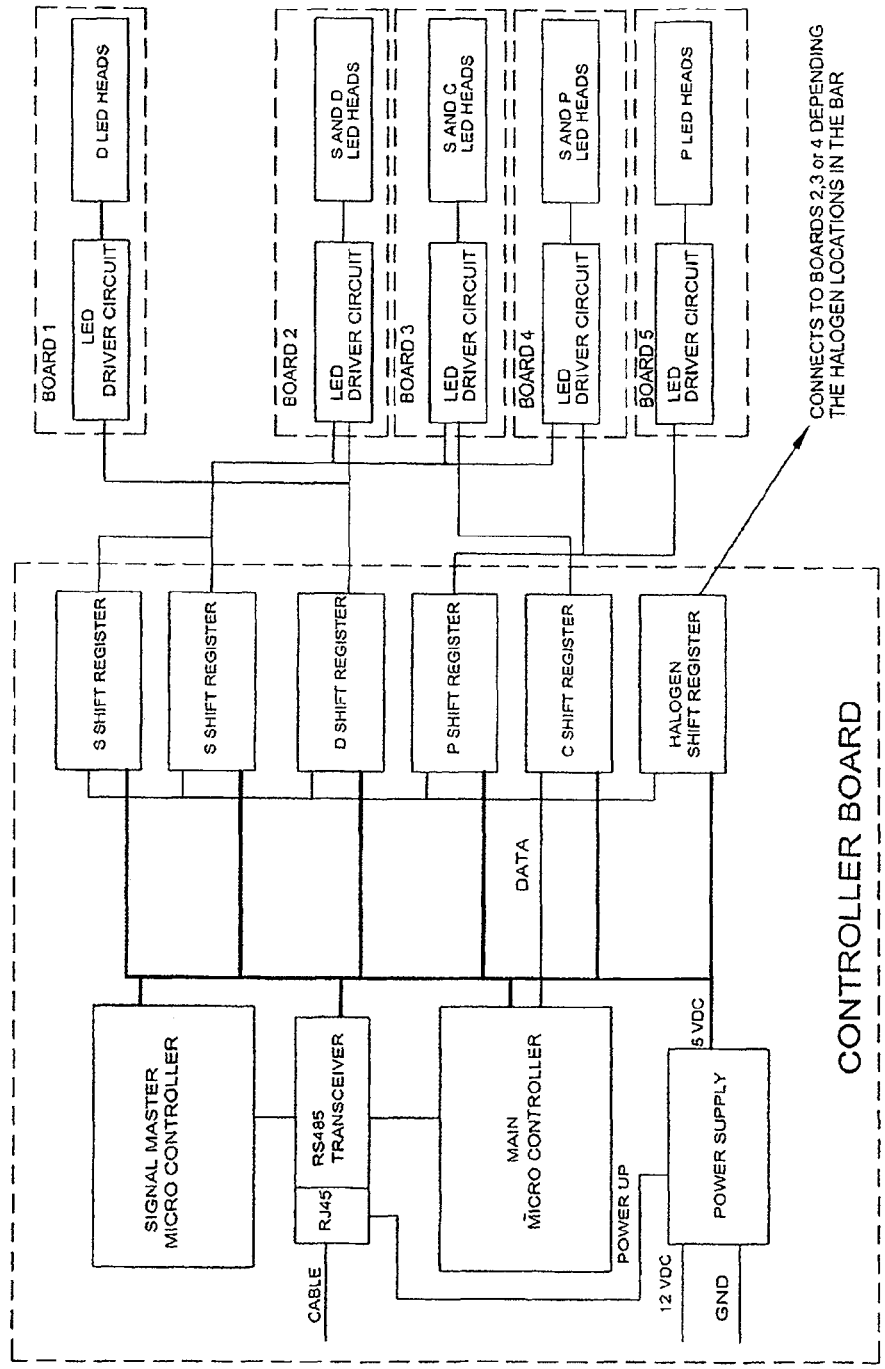
FIG. 12 is a schematic diagram of the controller in FIG. 4.

Based upon the data received in the stream, each of the microcontrollers in FIG. 12 acts based upon embedded software. Examples of functions performed by the microcontroller include sending serial flash pattern streams to the shift registers to create a preprogrammed flash pattern. Other examples include powering down the light bar's circuitry to minimize parasitic current when the system is not being used.

The shift registers store the pattern data for each clock cycle and output a digital control signal to the LED drive circuitry. This control signal tells the LED circuitry to activate the LEDs or keep them in an OFF state. Combinations of these digital control signal streams going to multiple heads/LED drive circuits create the random or synchronized visual light patterns commonly seen in the patterns created by light bars.

Figure 13:
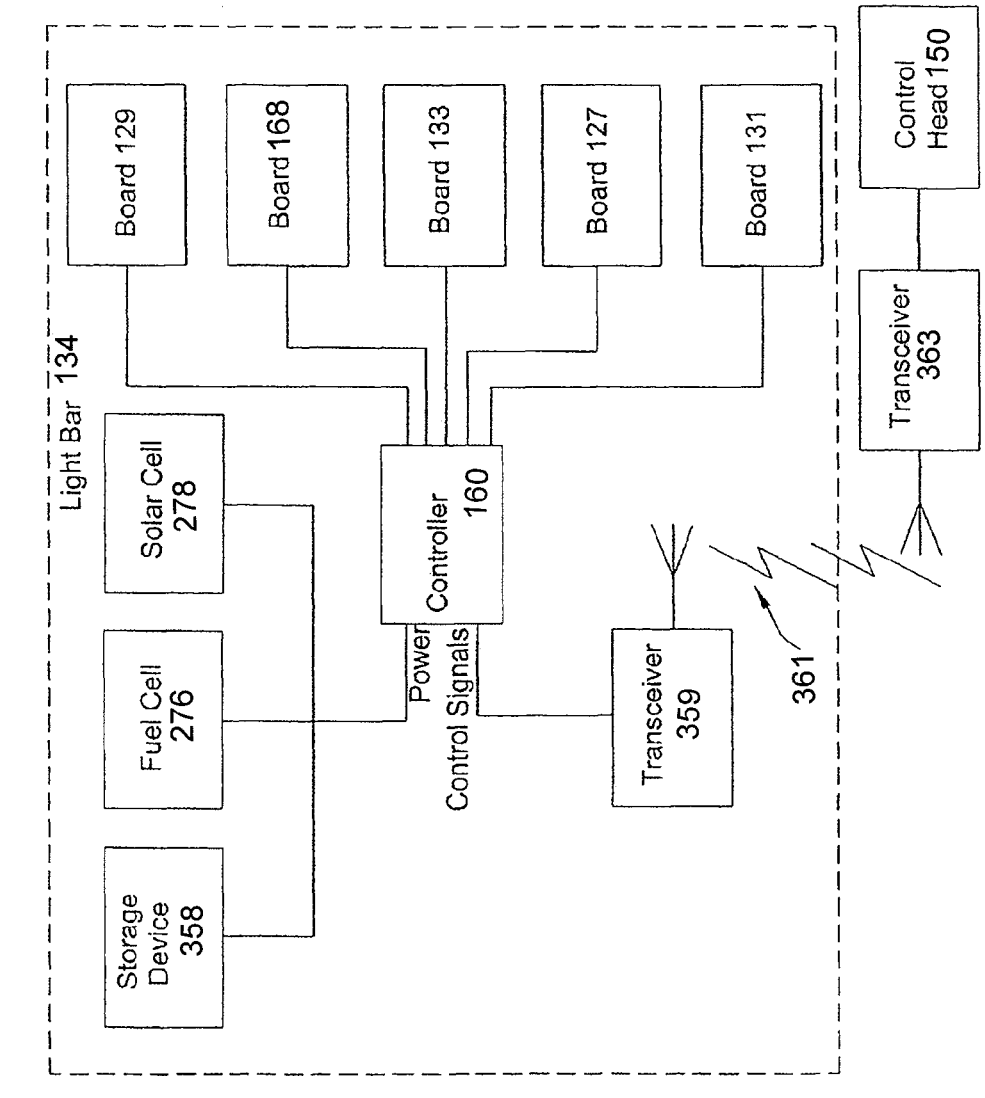
FIG. 13 illustrates an embodiment in which external power and signaling cables running to the light bar are eliminated by providing one or more power sources resident in the light bar and wireless receiver circuitry for receiving small signal commands from a remote control source.

Power to the circuit boards is preferably provided by power sources local to the light bar 134, thereby eliminating the need to provide a power cable from the vehicle 136 to the light bar 134. For example, as illustrated in FIG. 13, one or both of a fuel cell 276 and an array of solar cells 278 generate sufficient energy to power all of the electronics in the light bar 134. A suitable hydrogen fuel cell is Nab II available from Jadoo Power Systems of Folsom, Calif., U.S.A., and suitable solar cells are available from BP Solar of Warrenville, Ill., U.S.A. The fuel cell 276 is mounted to an interior space of the light bar 134, whereas the array of solar cells 278 is mounted to an external surface of the light bar such as the top section 19*d* of the housing 19 in FIGS. 1, 8 and 11. Of course, both the fuel cell 276 and the array of solar cells 278 can be located elsewhere and even on the vehicle 136 itself.

There may be times when the solar cells 278 produce energy that is not immediately used by the light bar 134. In those situations, an energy storage device 358 stores the energy so that it can be later used by the light bar. For example, the solar cells may produce more energy than used by the light bar during a sunny day. That unused energy is stored in the storage device 358 and used when the solar cell is unable to provide sufficient power such as in the evening or during cloudy day conditions. Of course, the fuel cell 276 can also supplement the solar cells, but it cannot be easily charged with the unused energy from the solar cells 278, thus requiring a storage device 358 such as a battery or the previously identified ultra capacitor. In order to orchestrate the storage of energy and the delivery of the energy to the light bar from among the three sources of the fuel cell 276, the array of solar cells and the storage device, an appropriate power supply circuit switches among or blends the energy from these sources. The power supply circuit can be made part of the controller 160 or constructed separately.

As a further alternative, the light bar 134 can be made completely wireless by providing a transceiver 359 (FIG. 13) with the controller 160 so that the control signal from the control head 150 are delivered to the controller 41 as electromagnetic signals 361, which are preferably short range radio frequency signals. The control head 150 provides its control signals to a transceiver 363, which broadcasts the control signals as low power RF signals to the transceiver 359. For example, the electromagnetic link 361 between the controller 150 and the control head 150 may be in accordance with the well known Bluetooth protocol, which is maintained by the Institute of Electrical and Electronic Engineers (IEEE) as its 802.15.1 standard. However, those familiar with low power RF communications will appreciate that many other communications protocols can be used, including other IEEE standards. Those skilled in the art of short distance wireless communications will appreciate that a receiver may be substituted for the transceiver 359 if the communications path is one way between the control head 150 and the controller 160. Likewise, a transmitter may be substituted for the transceiver 363.

FIG. 14 is a schematic diagram of the circuitry in the light bar 134 with fuel cell 276 and solar cell 278. In the schematic diagram, the fuel cell 276 and solar cell 278 each feed a regulator 282. The regulator maintains a constant voltage to the light bar 134. The solar cell 278 charges the battery 280 so that the light bar can keep operating in dim light and at night.

The MDT 164 accepts signals via a Bluetooth IEEE 802.15 network. In one embodiment of the light bar, the signals include voice commands and voice messages broadcast over a network. Data broadcast over the network may be broadcast over the LMR 262 or either of the transceivers 254 and 260. A variety of companies including Motorola and Nokia make appropriate Bluetooth headsets 273. A user wears a hands free headset 273 so that commands are issued without distracting from the user's other duties and activities.

The MDT 164 includes a display 164*a*. Preferably, the display is a touch screen as discussed above in connection with FIG. 3 so that the user can enter commands by simply touching the screen. However, other types of displays can be substituted for the touch screen or may complement it. For example, a conventional liquid crystal display can be used as the display 164*a*. A computer 250 controls the display 164*a*, provides a keyboard for entering commands and receives commands and voice messages from the Bluetooth headset 273. The computer 250 transmits commands and receives messages from the emergency device 102 in the light bar 134. In one embodiment of the light bar 134, the computer 250 uses a transceiver 252 compliant with the IEEE 802.11 specification for transmitting data to the light bar 134 over a Wi-Fi network. In one embodiment of the invention, the display 164*a*, computer 250 and radio 252 are integrated into a single laptop computer acting as the MDT 164 as illustrated in FIGS. 1 and 2B.

The light bar 134 receives commands from the MDT 164 over a Wi-Fi network. The transceiver 254 connects to a router 256, which forwards data packets from the transceiver 254 across the network. The router 256 is of conventional design and may be any of several commercially available models. For example, the MDT 164 issues a command for the video camera 258 to begin recording. The command is transmitted to the light bar 134 and received by the transceiver 254. The transceiver sends the data to the router. The video camera 258 has an Ethernet port conforming to the IEEE 802.3 protocol. The camera 258 connects directly to the Ethernet router 256 using a standard Ethernet cable. The router thereby forwards the command issued by the MDT 164 to the camera 258. In response to the command, the camera 258 begins recording. Additionally, the camera 258 sends the video signal to the MDT 164 via the router 256 and the transceiver 254. The MDT 164 displays the live video feed on the display 164a. Other devices with an Ethernet port, such as the public safety radio 260 connect directly to the router. In one embodiment of the light bar 134, all modules contain an Ethernet port for direct connection to the router 256.

The light bar 134 receives commands from the MDT 164 over a Wi-Fi network. The transceiver 254 connects to a router 256, which forwards data packets from the transceiver 254 across the network. The router 256 is of conventional design and may be any of several commercially available models. For example, the MDT 164 issues a command for the video camera 258 to begin recording. The command is transmitted to the light bar 134 and received by the transceiver 254. The transceiver sends the data to the router. The video camera 258 has an Ethernet port conforming to the IEEE 802.3 protocol. The camera 258 connects directly to the Ethernet router 256 using a standard Ethernet cable. The router thereby forwards the command issued by the MDT 164 to the camera 258. In response to the command, the camera 258 begins recording. Additionally, the camera 258 sends the video signal to the MDT 164 via the router 256 and the transceiver 254. The MDT 164 displays the live video feed on the display 164a. Other devices with an Ethernet port, such as the public safety radio 260 connect directly to the router. In one embodiment of the light bar 134, all modules contain an Ethernet port for direct connection to the router 256.

Devices without an Ethernet port connect to a controller 264. The controller 264 interfaces with each module and a serial to Ethernet converter 271, which provides an interface between the controller and the router 256. The converter 271 translates data packets forwarded by the router 256 and then the controller 264 sends commands to each of the connected modules, which include in the illustrated embodiment the radar unit 266, biological and chemical sensors 268, the LPR 270 and the GPS 272. The controller 264 also interfaces with the warning light assemblies 274. For example, a user turns on the lights by way of commands entered at the MDT 164. The MDT sends the command over the Wi-Fi network to the transceiver 254. The transceiver forwards the data to the router 256 and the router forwards the data packet to the converter 271, which in turn provides serial commands to the controller 264. The controller 264 interprets the serial commands and turns on the lights 274. Similarly, a user controls the GPS 272, LPR 270, sensors 268 and radar 266 from the MDT 164. Likewise, modules send data to the MDT 164. For example, the radar 266 detects the speed of nearby vehicles. The radar sends the speed data to the controller 264, which outputs a serial data stream to the converter 271. The converter 271 formats the speed data as an Ethernet data packet and sends the packet to the router 256. The router forwards the packet the transceiver 254 where it is sent over the Wi-Fi network to the MDT 164. The MDT formats and displays the speed. A user thereby receives real time information on the speeds of nearby vehicles.

The controller 264 also interfaces with the land mobile radio (LMR) 262. Voice and data messages from either the light bar or the MDT are sent over the LMR 262 or the public safety radio 260. Additional transceivers are added to the system for connecting to additional networks, such as a cellular telephone network or a community Wi-Fi mesh network among others. Additional modules may be housed in the light bar 134 and modules may be removed from the light bar 134 as necessary for a given expected emergency. By way of example, controller 264 may be a Terra3 Intelligent RTU (Remote Terminal Unit) from Federal Signal Corporation, Oak Brook, Ill., U.S.A. The converter 271 may be a TS900 Series serial to Ethernet converter by EtherWAN Systems, Inc., Via Rodeo, Placentia, Calif. 92870, U.S.A.

FIG. 15A depicts a community Wi-Fi mesh network for use by one embodiment of the light bar 134. Towers 286a, 286b, 206c and 286d act as nodes within the mesh network, routing data as needed among themselves and to the backhaul system 288 for connection to the Internet 290. Various devices with Wi-Fi capabilities can connect wirelessly to the mesh network thru the towers 286. Vehicles 284a, 284b and 284c are each equipped with a light bar 285a, 285b and 285c, respectively, as described above. Each of the light bars connects to the Wi-Fi mesh network using an 802.11 compliant transceiver in the light bar 285. Using the MDTs in the vehicles 284, occupants of the vehicles send data to the control center 292. In one embodiment, vehicle 284a records live video with a video module in light bar 285a. The occupant of vehicle 284a sends the live video feed over the Wi-Fi network using a transceiver in the light bar 285a. The transceiver connects to tower 286a and the video feed is forwarded to the backhaul system 288. The backhaul delivers the video feed to the control center 292 either directly or via the internet 290 as indicated in FIG. 11A. The U.S. patent application Ser. No. 11/505,642, filed Aug. 17, 2006, now issued as U.S. Pat. No. 7,746,794, and entitled "Integrated Municipal Management Console" depicts one embodiment of the control center. In keeping with the description in the '794 patent, personnel in the control center 292 view the live video feed from vehicle 284a and alert or marshal resources as needed. Alternatively, the control center can enable the camera in the light bar 285a remotely.

In another embodiment of the system supporting the light bar, a video feed from light bar 285a is sent to the MDT in vehicle 284b. In a first embodiment the video feed is sent from light bar 285a to the control center 292. The control center 292 then forwards the video feed over the internet 290, backhaul 288 and nodes 286 to the light bar 285b. Light bar 285b transmits the live video feed from 285a to the MDT in vehicle 284b. The occupant of vehicle 284b can therefore see a live image of the video feed taken by light bar 285a. In yet another embodiment of the system supporting the light bar, the live video feed is sent directly from light bar 285a over the Wi-Fi mesh network to light bar 285b. The video feed is then sent to the MDT in vehicle 284b where the occupant of the vehicle views it. Any data from a module can be sent over the network to the control center or to other vehicles. Voice messages using VoIP or traditional voice networks can also be sent from a vehicle to the control center and from the control center to a vehicle or from a first vehicle directly to a second vehicle. Further, the control center can send any appropriate data for display on the MDT or for announcement by a vehicle's built in speakers or through a user's Bluetooth headset.

In one embodiment of the invention depicted in FIG. 15B, outdoor warning sirens 294 act as nodes in a Wi-Fi mesh network allowing vehicles 284a, 284b and 284c to connect to the network. The outdoor warning sirens 294 connect to a tower 296. The tower 296 provides further access to the backhaul, internet or other appropriate network for connecting to a control center. In keeping with one embodiment of the invention, FIG. 15C depicts a point to multipoint network with vehicles 284a, 284b and 284c connecting directly to tower 298 that provides access thru an appropriate network connection to a control center. In another embodiment of the invention, depicted in FIG. 15D, vehicles 284a, 284b and 284c connect to a cellular network 300. The cellular network 300 provides access to a control center. FIGS. 15A, 15B, 15C and 15D illustrate possible network protocols and configurations. Embodiments of the invention utilize any appropriate wireless network protocols and network configurations for connecting emergency device 102 to a control center.

Figure 16:
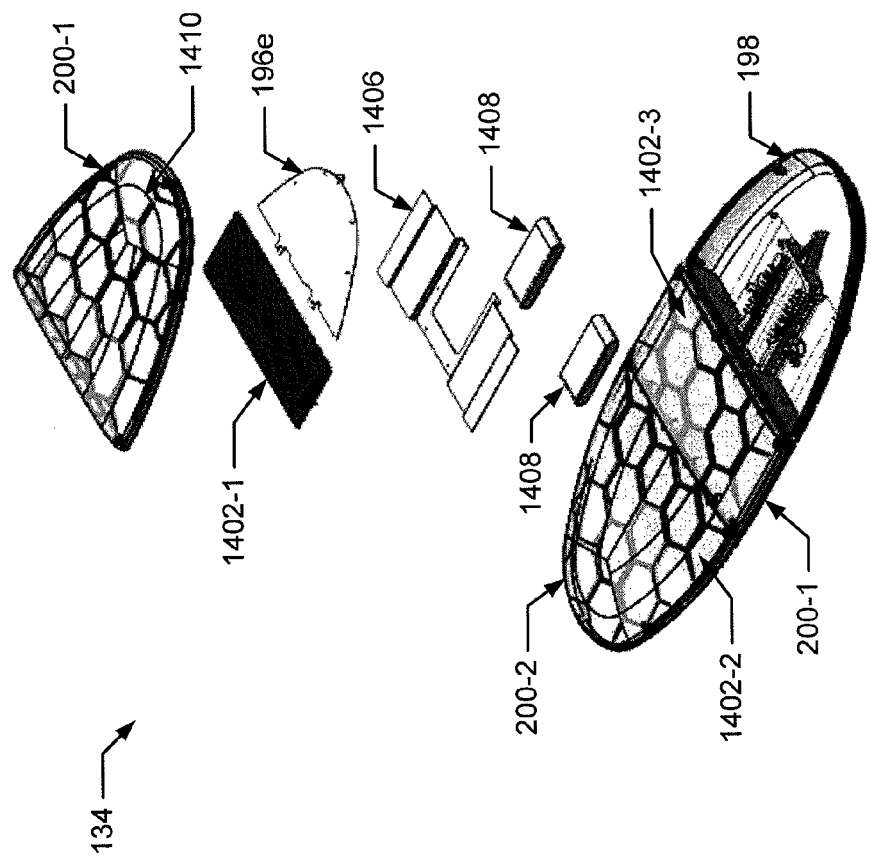
FIG. 16 is a perspective view of the light bar according to the embodiments of FIGS. 17, 17A, 17B, 17C with the assembly comprising one of the end sections of the light bar exploded to more easily show the various parts.
Figure 17:
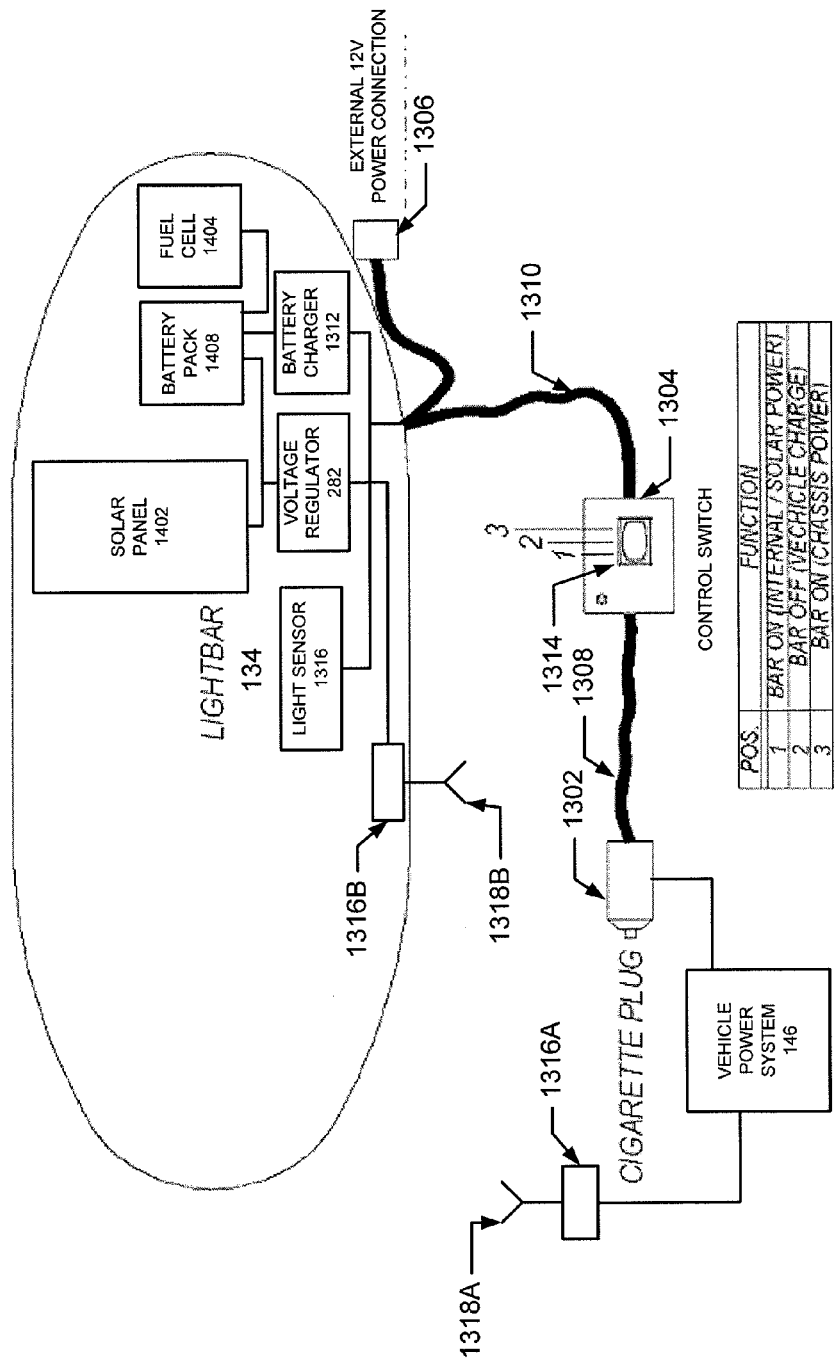
FIG. 17 is a schematic diagram of a further embodiment of the invention in which solar panels and battery packs internal to the housing of the light bar are the primary power sources to operate the bar.

In keeping with the embodiment of the light bar where the power source is integrated within the light bar, the power source includes at least a solar panel and a rechargeable Lithium-Ion battery pack as illustrated in FIGS. 16 and 17. The solar panel and the rechargeable Lithium-Ion battery pack are used alone or in combination to provide power to the light bar components described above.

Referring to FIGS. 16 and 17, the light bar 134 includes one or more solar cells 1402 arranged on a solar panel and one or more battery packs 1408, which are controlled by a control switch 1304. For example, the solar cells 1402 can be those manufactured by PulseTech Products Corporation, 110 South Kimball Ave., Southlake, Tex. 76092, USA, and the battery packs 1408 can be Lithium-Ion battery packs manufactured by Applied Power Inc, 111 Summit St., Brighton, Mich. 48116, USA. The control switch 1304 is of conventional design and can be custom designed or purchased from a suitable vendor. The battery packs 1402 may be recharged by way of a connector 1306 mounted to the exterior of the light bar to allows a 12 volt power supply to plug to the connector 1306 and charge the batteries 1408 through an internal battery charger 1312 as described in more detail hereinafter. The battery charger 1312 is suitable for charging batteries 1408 of various types, such as Lithium-Ion batteries. One such charger is available from AstroFlight, 13311 Beach Ave Marina, Del Rey, Calif. 90292, U.S.A. Lithium-Ion batteries need not be the only type of battery 1408. Batteries 1408 must have an appropriate storage capacity, voltage and current specification for driving the electrical devices contained within the light bar 134 such as warning lights. Preferably, the batteries have a capacity to provide for approximately 12 hours of continuous driving of LED-based warning lights housed within the light bar 134. Lithium-Ion batteries are preferred because of their high density, compact size, and fast charging rate.

In a further embodiment, the light bar 134 may include a fuel cell 1404 as an additional internal power source. The fuel cell maintains its charge for a much longer time period then the internal batteries. Fuel cell 1404 can be used to power the light bar directly or can be used to recharge the battery pack 1408.

In still a further embodiment, the light bar 134 has four warning light heads with following configurations:

| Four-Head Warning Light Power Requirement |
|---|
| 4 Watts × 4 heads × 12 hours = 192 Watt-hours |
| Lithium-Ion Battery-Pack System |
| 5 packs × 6 cells × 7.6 Watt-hours = 228 Watt-hours |
| Power Conversion Efficiency = 85% |
| Available Watt-hours = 228 Wh × 85% = 193.8 Watt hours |
| Extra Power Margin from Solar Panels |
| 4 panels × 6 Watts × 4 hours = 96 Watt-hours |

An embodiment of a light bar 134 configured as described above was tested on Jul. 1-2, 2009. The solar panels 1402 were disconnected. A 4-head light bar prototype was equipped with five (5) Li-ion battery packs charged to full capacity. The test started at 2:25 pm on July 1 and continued for four hours, at which point it was interrupted for the night. The test was resumed at 6:00 am on July 2, without battery re-charge, and continued for eight hours. At the end of test the remaining battery charge was at a safe level (within the battery recommended specification).

A test was performed on Jul. 6, 2009. The solar panels were providing power to the light heads, which diminished the power demand from the battery packs. The test was taken in University Park, Ill., at full sun with the light bar placed horizontally, oriented in the East-West direction.

| Time | Percent of Solar Power vs. Total Power demand |
|---|---|
| 11:00 a.m. | 59% |
| 12:00 | 61% |
| 1:00 p.m. | 60% |
| 2:00 p.m. | 19% with cloud coverage |
| 2:10 p.m. | 62% |
| 3:10 p.m. | 54% |
| 4:05 p.m. | 20% with cloud coverage |
| 4:10 p.m. | 44% |

FIG. 16 shows an exploded view of the light bar 134 having solar panels 1402-1, 1402-2, and 1402-3, and Lithium-Ion battery packs 1408. The solar panels 1402-1, 1402-2, and 1402-3 are illuminated through the transparent top domes/housings 200-1, 200-2, and 200-3. The top domes 200-1, 200-2, and 200-3 can be made into a single component or three separate pieces as illustrated. Solar panel 1402-1 is shown as part of the exploded assembly, whereas solar panels 1402-2 and 1402-3 appear as gray shaded images under the domes 200-2 and 200-3, respectively.

The Lithium-Ion battery packs are distributed in different locations inside the light bar. They are accessible in end sections of the light bar under the inner board panels 196(b) and 196(d), with connections via terminated wires that plug into terminals on the inner boards 196(c) (on both sides of the light bar). It is important to follow the exact connections and locations of the original battery packs when performing the replacement. Additional battery packs may be located in the center sections of the light bar under the center panels 1402-2, with the wires connecting to the inner ROC boards in the adjacent end section of the light bar.

In addition, the top domes 200-1, 200-2, and 200-3 include lens structures (honey comb structures) 1410 for converging the sun light onto the solar panels for improved efficiency. For example, each cell in the honeycomb structure can be a Fresnel lens formed from the material of the domes for directing ambient sunlight to the solar panels.

The solar panels 1402-1, 1402-2, and 1402-3 are attached to the bottom of the top domes 200-1, 200-2, and 200-3. To accommodate the Lithium-Ion battery packs 1408, the circuit board 196(b) and 196(d) in FIG. 8 are replaced with the battery support structures 1406, where the Lithium-Ion battery packs 1408 are attached to the bottom of the battery support structures 1406. As an alternative, the support structures 1406 supports both the battery pack 1408 and the solar panel 1402-1, 1402-2, and 1402-3.

Lithium-Ion battery packs are distributed in different locations inside the light bar. They are accessible in end sections of the light bar under the inner board panels 196(b) and 196(d), with connections via terminated wires that plug into terminals on the inner boards 196(c) (on both sides of the light bar). It is important to follow the exact connections and locations of the original battery packs when performing the replacement. Additional battery packs may be located in the center sections of the light bar under the center panels 1402-2, with the wires connecting to the inner ROC boards in the adjacent end section of the light bar.

Turning to FIG. 17, the solar panels 1402 and on-board battery packs 1408 are connected by a voltage regulator 282 of conventional design for powering various components of the light bar 134. The internal battery packs 1408 are also connected to an internal Lithium-Ion battery charger 1312 via a two conductor connector 1306 outside the light bar housing. Those skilled in the art of batteries and battery chargers will appreciate that the charger 1312 most be designed specifically for charging Lithium-Ion batteries. The light bar control box 1304 connects with the light bar 134 via a four conductor cable 1310. It also connects with the vehicle power system 146 via a provided cigarette plug 1302.

The control box 1304 has a three position switch 1314. Position one (1) indicating "Self Power" turns the light bar 134 on using its on-board battery/solar power (1402 and 1408). Position two (2) indicating "Off" (neutral) turns the light bar 134 off and charges the vehicle battery 146 via the cigarette plug 1302 when adequate illumination is available on the solar panels 1402. Position three (3) indicating "Chassis Power" turns the light bar 134 on using the vehicle power 146. In a further embodiment, switch 1314 may has a fourth position, e.g., position (4), indicating "Fast Charging" connects battery charger 1312 to the external power source through connector 1306 so as to fast charge battery pack 1408.

From the light bar assembly 134, one or more cables 1310 are routed into the vehicle's cabin near the location of the power control switch 1304. The one or more cables 1310 are then connected to the light bar power switch 1314. The cigarette plug 1302 from the light bar power switch 1304 is plugged into the vehicle cigarette plug receptacle through cable 1308. The cables 1310 includes one or more power lines and signal lines that carries either the charging current or control signals to the light bar assembly.

When the vehicle power system 146 is used to provide trickling charging of the battery pack 1408, the cable 1310 can be made very thin because the charging current and signals are small, thereby making it very easy to route the cables 1310 from the cabin to the light bar assembly.

As mentioned above, a control switch 1304 is provided with the system. Referring to FIG. 17, the control switch 1304 is a three position switch 1314:

| Switch Position | Function |
|---|---|
| 1 | Light bar ON using its on-board power |
| 2 | Light bar OFF/Trickle charge vehicle battery when solar panels have adequate illumination |
| 3 | Light bar ON using vehicle chassis power |

In one embodiment of the invention, the control switch 1304 is a manually operated, single-pull switch of conventional construction. The manual switch 1314 allows an operator or user of the light bar 134 to select the power source from among the solar panel 1402, the battery pack 1408 and the external power source. Because it is manually operated, the switch is preferably located within the passenger compartment of the vehicle in order to provide easy access for the vehicle operator, who is typically a first responder when the vehicle is an emergency vehicle such as a police or fire vehicle.

A cigarette-plug connection to the vehicle chassis power is provided. In the switch positions One and Two, no current is drawn from the vehicle chassis. In position Two, the vehicle battery is trickle charged through a diode that bypasses the switch and prevents current flow in the opposite direction. For example, when it is switched to position 2, control switch 1304 sends a control signal to the battery charger 1312 to start trickling charging the battery pack 1408. In this embodiment, the battery charger 1312 includes trickling charging circuit to draw small currents from vehicle power system 146 so as to charge battery pack 1408. Because the current used to trickle charge the battery can be very small, the wires in cable 1310 and 1308 for carrying the charging current can be made very thin and easy to install. The battery charger provides trickle charging in a conventional manner.

In an alternative embodiment, switch 1314 can have a fourth position for charging the battery using external power source connected through connector 1306. In this embodiment, battery charger 1312 can be switched to provide regular charging of battery pack 1408, in response to control signals from control switch 1304. In particular, the battery charger 1312 can operate in regular and trickling charging modes. When switch 1314 is switched to position 2, battery charger 1312 operates in the trickling charging mode as described above. When switch 1314 is switched to position 4, battery charger 1312 operates in the regular charging mode and draw charging currents from an external power source through connector 1306.

Each LED warning light head of the light bar 134 can be amber, blue, or red. The light head (e.g., 172 in FIG. 7A) has a replaceable reflector and the front dimensions of the projecting light are for example 1.6" in height and 3.4" in width. The light bar frame has a modular design in keeping with the construction illustrated in FIGS. 4 and 6-10, including end modules 196*a* and 196*e*, a center light-bar module 168, and two boards 196*b* and 196*d*. Each of board 196*b* and 196*d* includes two (2) LED heads integrated with optical reflectors and electronic drivers. The light bar 134 also includes replaceable LED reflectors (e.g., see FIG. 7A), two (2) inner boards, power converters, a light-bar controller, five battery-pack modules with Li-ion cells, four solar-panel modules; and shore charger module 1306 (FIG. 17).

As shown in FIG. 17, the solar light bar system includes a light bar 134, a light-bar mount, a control switch 1314 with wires, and a cigarette plug 1302. The light bar assembly 134 contains all the systems necessary for operation and can be shipped pre-wired to its control switch 1314. The only wiring connection with the vehicle is via a provided cigarette plug 1302. The control wires provided with the system can enter the cabin via a vehicle's door seal for easy installation. The control switch 1314 can be Velcro-mounted in the cabin if desired. The mount for the light bar is described in FIGS. 5A and 5B and is easily portable between vehicles.

The light bar system shown in FIG. 16 meets the SAE J845 Class 1 specification for light output. It can operate for 12 hours on its own Lithium-Ion battery packs and solar power. Preferably, the light bar system does not draw any power from the vehicle electrical system during normal operation, unless it is deliberately switched to chassis power. If the lights are not operating and the solar panels have adequate illumination, the solar panels automatically charge the vehicle battery.

Operating controls are provided by three-position switch 1314, including (1) on self-power, (2) off and charge, and (3) on chassis-power. The system has a shore power connector 1306, rated at 12V DC and 6 Amps, to connect to the on-board battery charger 1312. Amber, red, and blue LED modules are available from Federal Signal Corporation, each meeting appropriate color specifications per SAE J578. LED light heads are mounted on easily exchangeable modules. Multiple flash patterns are easily selectable. The system is modular and self contained, with all components, except for switches 1314 and mounts, contained in one housing. The vehicle roof mounts of FIGS. 5A and 5B fit a variety of vehicles. The size of the system is that of a standard Arjent light bar manufactured by Federal Signal Corporation. Wiring complies with the General Technical Requirements of the Arizona Solicitation T09-19-00011, which is hereby incorporated by reference in its entirety.

In a further embodiment, an external power source is connected to the light bar 134 for providing power in addition to the integrated internal solar panel 1402 and the battery pack 1408. For example, when the light bar 134 is mounted on a police patrol vehicle, the battery 146 of the police vehicle may provide an external power source for powering the integrated light bar. The vehicle battery 146 can be connected to the integrated light bar by way of hard wiring or tapping, or through a cigarette plug 1302 connected to the light bar.

In an alternative embodiment, the light bar system includes a control circuit for trickle charging the light bar battery pack 1408 during normal operation of the vehicle. The trickle charging can be provided through either a wired or wireless connection. The advantage of trickle charging is that the batteries potentially never have to be plugged into a charger off of the vehicle. When the solar panel 1402 is used to charge the batteries, they can be supplemented by a trickle charge capability provided by the vehicle's electrical system that enables the battery pack 1408 to drive the light bar indefinitely.

Depending on the environment, the solar cells 1402 can provide much of the recharging of the batteries 1408. But even in the sunniest of environments, the solar cells 1402 may not be enough to keep the batteries 1408 fully charged. However, normal operation of the vehicle will produce enough excess electrical capacity to reliably trickle charge the batteries 1408. The trickle charging circuit draws power from the vehicle's electrical system and provides a continuous constant-current charge at a low rate which is used to complement the solar cell 1402 to maintain the battery 1408 in a fully charged condition.

As shown in FIG. 17, the control switch 1314 includes circuitry to draw small currents from the vehicle battery 146 for trickle charging the light bar batteries 1408. In this embodiment, the connection is wired between the light bar batteries and the vehicle engine and the wire can be relatively thin because the current draw is low. This greatly simplifies installation.

Alternatively, trickle charging of the battery pack 1408 is provided through wireless energy transfer. For example, the battery charger 1312 in the light bar system shown in FIG. 17 includes a near field induction charging capability and charges the battery pack 1408 through induction. In particular, the charger 1312 includes a transformer 1316 formed by a primary coil 1316A and a secondary coil 1316B. The transformer 1316 includes uses the primary coil 1316A to create an alternating electromagnetic field from within the passenger compartment. The secondary coil 1316B is disposed within the light bar assembly or connected to the outer surface of the light bar housing and in proximity to the primary coil. The secondary coil 1316B takes power from the electromagnetic field and converts it back into electrical current to providing charging current to the battery charger 1312 so as to trickle charging the battery pack 1408. In order to prevent interference by the metal parts of the vehicle roof sitting between the primary coil and the second coil may be cut away.

Figure 17A:
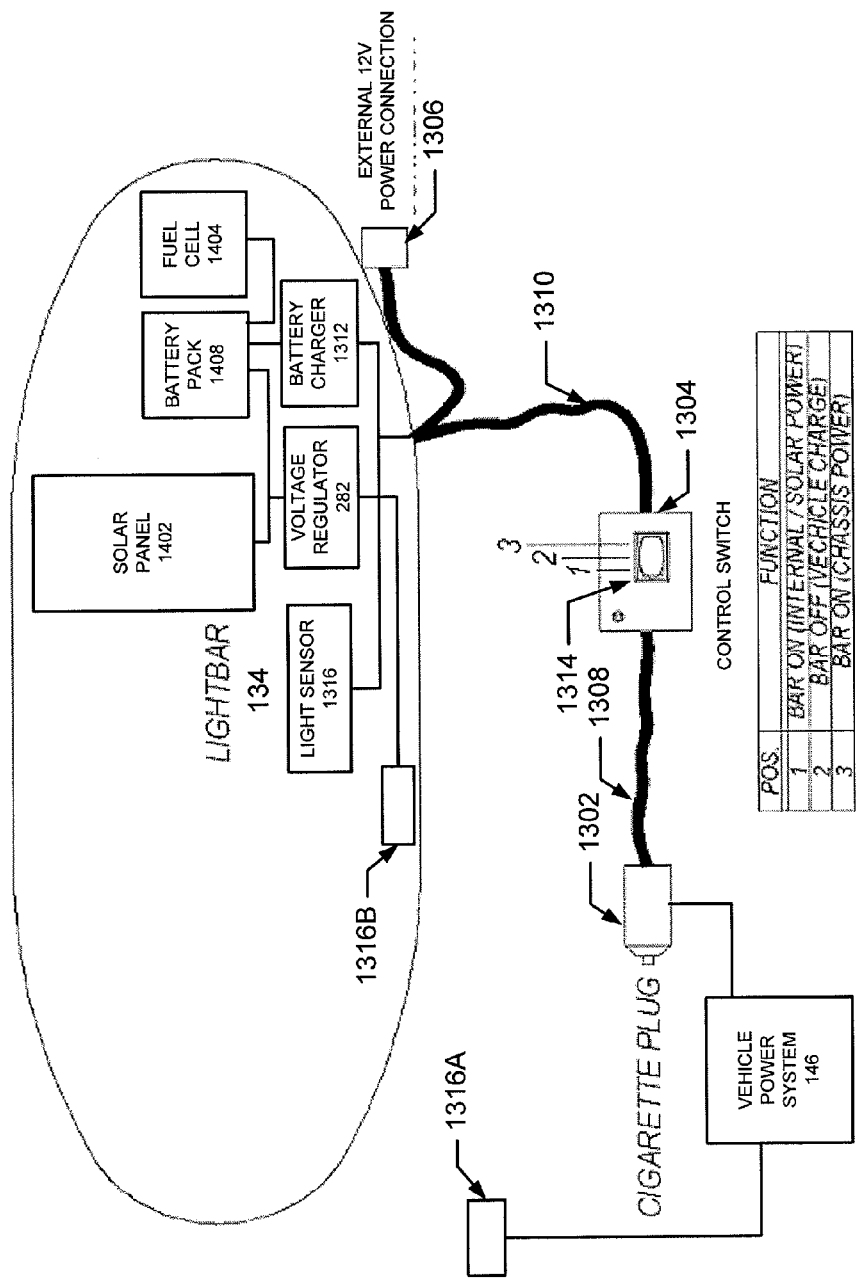
FIG. 17A depicts an alternative embodiment of the invention in which the battery charger is equipped with a wireless energy device for trickling charging the battery pack.

In an alternative embodiment as shown in FIG. 17A, the primary coil 1316A and the secondary coil 1316B may be separated at a greater distance. For example, the secondary coil 1316B is disposed within the light bar assembly or close to the light bar assembly on the vehicle roof, and the primary coil 1316A is attached to the outer surface of the engine hood and draws power from the vehicle electrical system. In this embodiment, the energy transfer is provided by strong coupling between the electromagnetic resonant coils 1316A and 1316B. The primary and secondary coils 1316A and 1316B include magnetic loop antennas tuned to the same frequency. Due to operating in the electromagnetic near field, the secondary coil is no more than about a quarter wavelength from the transmitter.

Figure 17B:
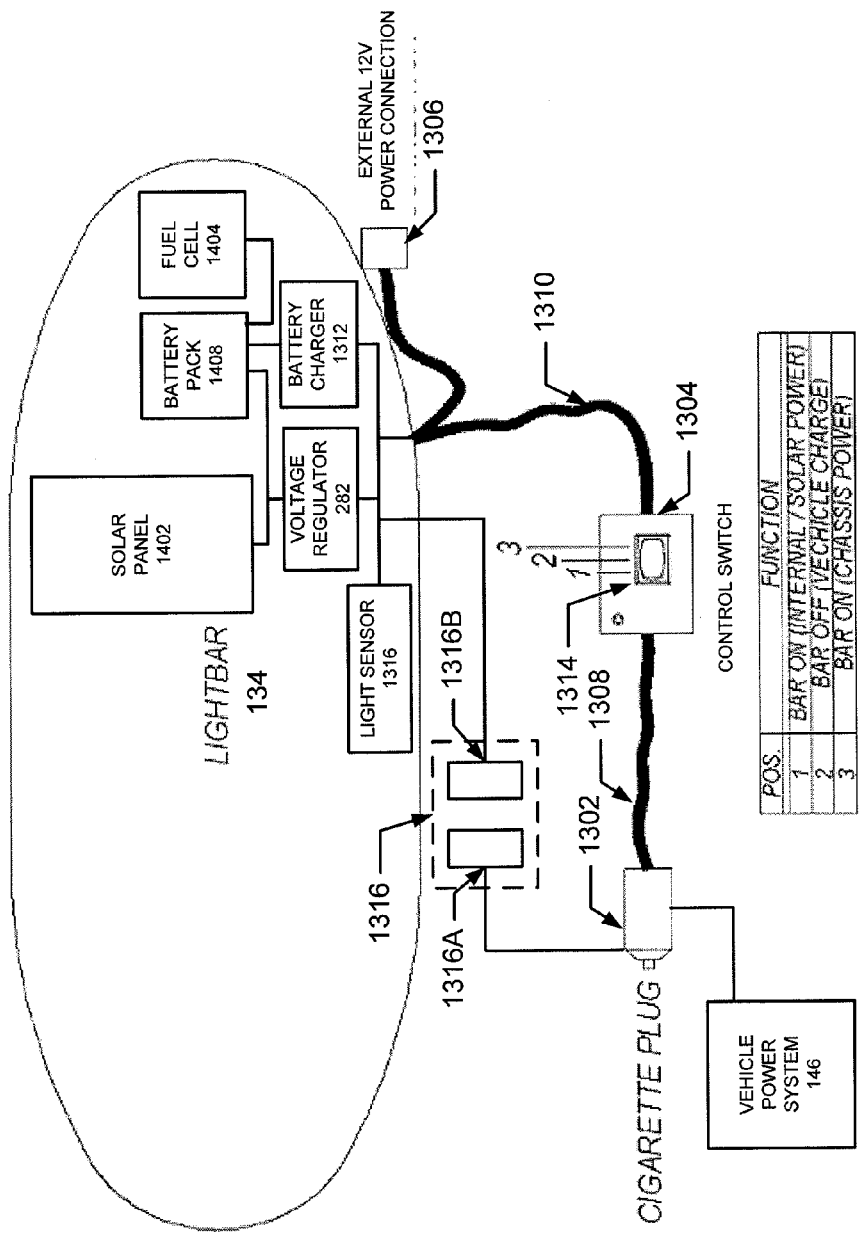
FIG. 17B depicts still an alternative embodiment of the invention in which the battery charger trickle charges the battery pack through a far field energy transfer device.

In still another embodiment, the wireless trickle charging of the battery pack 1408 is provided by far field wireless energy transfer as shown in FIG. 17B. In this embodiment, the secondary coil 1316B is disposed within the light bar assembly and the primary coil 1318A is attached to the outer surface of the engine hood and draws power from the vehicle electrical system. In order to increase the efficiency of the system, the primary coil 1318A is provided with high directivity antennas 1318A that makes the electromagnetic radiation of the system to match the shape of the receiving area thereby delivering almost all emitted power to the secondary coil 1316B. On the receiving side, the secondary coil 1316B may be equipped with a receiving antenna 1318B for receiving the energy transmitted through electric-magnetic radiation from antennas 1318A.

In a further embodiment, the connection between the control switch 1304 and light bar assembly 134 can be made completely wireless. The control signals can be transmitted through wireless transceiver and receiver and the trickle charging can be provided through induction as described above. In this embodiment, no wiring is required for installing the light bar.

Referring to FIG. 17, in a still further alternative embodiment, the control box 1304 includes an automatic control module for selecting the power source among the solar panels 1402, the integrated battery packs 1408, and the external power source 146. Specifically, the automatic control module 1304 detects the environmental conditions such as the lighting/illumination condition surrounding the light bar 134. If the environmental condition is below a certain threshold, the automatic control module 1304 then controls the switch 1314 to allow the light bar 134 draws power from the integrated Lithium-Ion battery 1408 or the vehicle battery 146. If the environmental condition is above a certain threshold, the automatic control module 1304 then controls the switch 1314 so that the light bar 134 is powered solely by the solar panel 1402. As another example, if the illumination onto the solar panel 1402 is sufficiently strong, the automatic control module 1304 controls the switch 1314 so that the Lithium-Ion battery 1408 is recharged by the solar panel 1402. If the illumination is weak and the Lithium-Ion battery 1408 is running low, the automatic control module 1304 controls the switch 1314 so that the light bar 134 is powered by the vehicle battery 146, while the Lithium-Ion battery 1408 is also recharged by the vehicle battery 146. If the illumination is sufficiently strong, the automatic control module 1304 controls the switch 134 so that the vehicle battery 146 is recharged by the solar panel 1402.

In order to switch among the power sources, the light bar 234 includes a light sensor 1316 for detecting the illumination condition. Alternatively, the automatic control module 1304 includes a voltage/current monitoring circuit for monitoring the voltage or current output by the solar panels 1402 and the Lithium-Ion battery packs 1408.

Figure 17C:
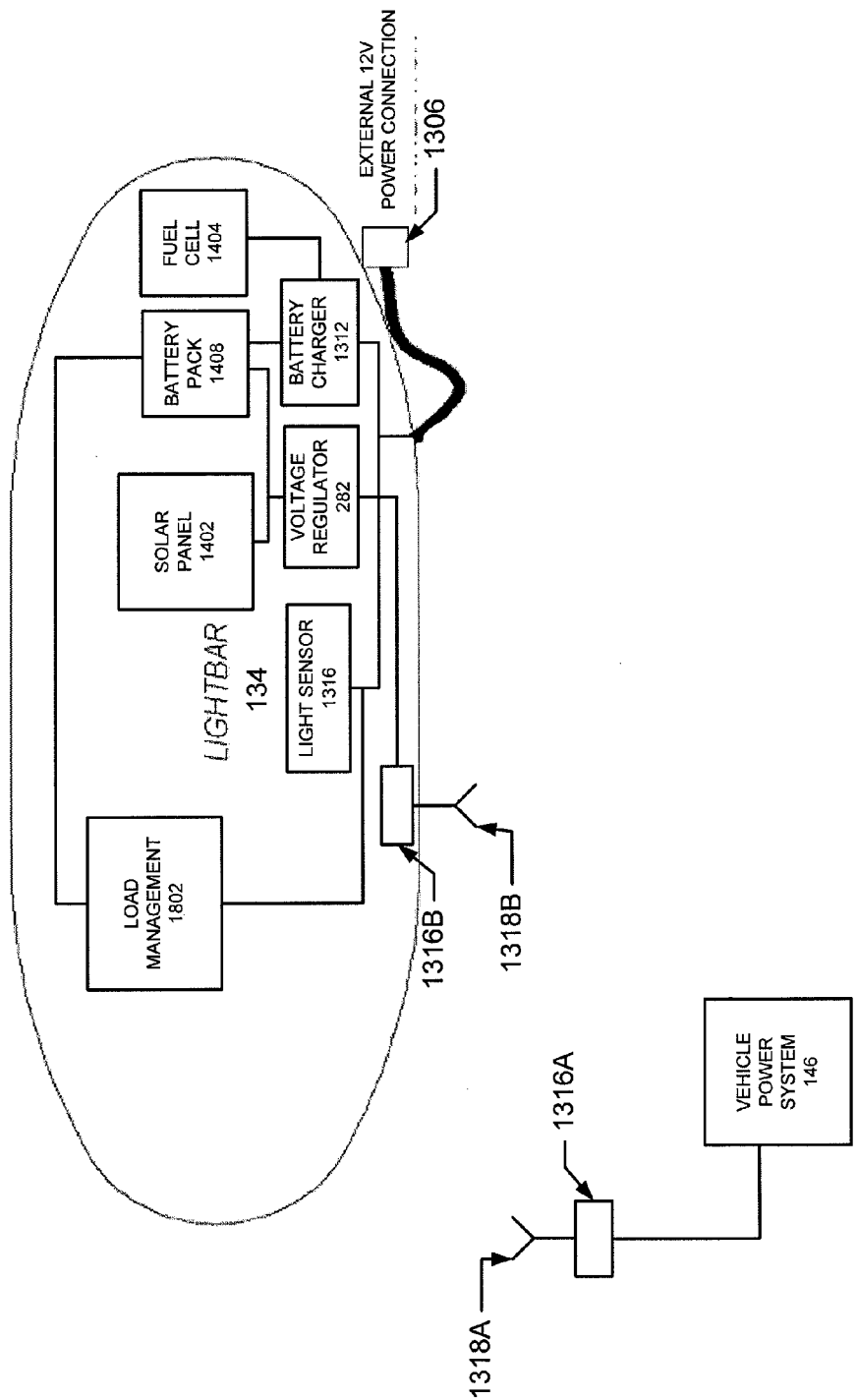
FIG. 17C depicts a further alternative embodiment in which a load management system is included in the interior of the light bar in order to automatically and dynamically orchestrate the sources of power for driving the electronics of the light bar.

In still another embodiment as shown in FIG. 17C, light bar 134 is provided with an on-board automatic load management module 1802 to replace the control switch 1304 for managing the charging of the battery. In this embodiment, light bar assembly 134 can be made completely wireless because the wired connection and control switch 1304 between the vehicle power system 246 and light bar assembly 134 is no longer required. As described above, charging of battery pack 1408 by the vehicle power system 148 is provided through wireless energy transfer between primary coil 1316A and secondary coil 1316B.

In general, load management module 1802 monitors the output voltage of battery pack 1408 and triggers various events in response to the output voltage level. Load management module 108 is similar to those described in U.S. Pat. No. 6,778,078, assigned to the same assignee, which is hereby incorporated by reference in its entirety and for everything it describes. Management module 1802 includes a programmable micro controller and its peripheral circuit components for carrying out various control functions described herein. In particular, when load management module 1802 detects that the output voltage of battery pack 1408 drops to a predetermined level, load management 1802 automatically selects one or more of the available power sources to charge the battery. For example, if the vehicle is outdoor and the illumination condition is satisfactory as detected by light sensor 1316, load management 1802 then switches and connects solar panel 1402 to battery charger 1312 so as to charge the battery. Alternatively or additionally, if the vehicle is blocked from the sun and the illumination condition is poor, load management 1802 then selects fuel cell 1404 or vehicle power system 146 to charge the battery.

As another example, when light bar 134 operates under full load and/or for a long period of time, the output voltage level of the battery may continue to drop even if solar panel 1402 or fuel cell 1404 is used to charge the battery. In this case, load management 1802 selects all of the available power sources to charge the battery. Specifically, solar panel 1402 and/or fuel cell 1404 are used to provide regular charging while vehicle power system 146 is used to provide consistent trickle charging so as to complement other sources.

Still further, when an external power source is connected to light bar 134 through connector 1306, load management 1802 detects the connection and automatically select the external power source to charge the battery and/or power the light bar assembly. If additional power sources are supplied to light bar assembly, load management 1802 can be readily modified and programmed to include those power sources and the operations are similar to those described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the light bar and its network environment (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the various embodiments of the light bar and does not pose a limitation on the scope of the invention unless otherwise claimed. No language in this description should be construed as indicating any non-claimed element as essential to the practice of the invention.

Preferred embodiments of the light bar and the system supporting it are described herein, including any best mode known to the inventor. Variations of those preferred embodiments may become apparent upon reading the foregoing description. The inventor expects skilled artisans to employ such variations as appropriate, and the inventor intends for the fully integrated light bar and its supporting network system to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for use by a vehicle, the system comprising:
an emergency device for mounting to the vehicle and housing at least one warning light;
a rechargeable power source disposed within the emergency device for powering the at least one warning light;
a solar energy source for converting solar energy into electrical energy associated with the emergency device;
a device connecting the solar energy source and the rechargeable power source to control the flow of energy from the solar energy and rechargeable power sources to the at least one warning light such that the energy from the solar energy source charges the rechargeable power source and powers the at least one warning light;
a control interface in an interior of the vehicle in communications with the emergency device for controlling the at least one warning light; and
a trickle charging source separate from the solar energy source, wherein the trickle charging source charges the rechargeable power source from an external power source using excess energy generated by a power train for the vehicle,
wherein the external power source is external to the emergency device and provides a substantially continuous and substantially constant charge to the rechargeable power source, wherein the external power source supplements the charge provided to the rechargeable power source by the solar energy source, and
wherein the trickle charging source comprises a wireless connection between the rechargeable power source and the external power source via two electromagnetic coils.

2. The system of claim 1 wherein the control interface includes a control switch which select at least one of the rechargeable power source, the solar energy source, and the external power source to power the at least one warning light.

3. The system of claim 1 further including a battery charger for receiving power from at least one of the solar energy source and the external power source so as to charge the rechargeable power source.

4. The system of claim 3 further including a voltage regulator for regulate the power provided for the at least one warning light from at least one of the rechargeable power source, the solar energy source and the external power source.

5. The system of claim 2 further including a light sensor for sensing an illumination condition, wherein the control interface automatically performs the selection in response to the detected illumination condition.

6. The system of claim 2, wherein the control switch includes:
a first position for selecting at least one of the solar energy source and the rechargeable power source to power the at least one warning light;
a second position for turning off the emergency device; and
a third position for selecting the external power source to power the at least one warning light.

7. The system of claim 6, wherein the external power source includes a vehicle power system.

8. The system of claim 1, further including an output connector for outputting the power generated by the solar energy source.

9. The system of claim 1, wherein the emergency device further includes a housing and the solar energy source includes one or more solar panels disposed on an outer surface of the housing.

10. A light bar for mounting to a roof of a vehicle, the light bar comprising:
a closed housing containing a plurality of warning lights intended to warn anyone in proximity to the light bar of a dangerous condition associated with the vehicle;
a rechargeable power supply mounted within the closed housing;
a solar-electrical energy source; and
a connector for coupling an external power supply to at least recharge the rechargeable power supply;
a power controller for controlling a flow of energy from the rechargeable power supply and the solar-electric energy source to the plurality of warning lights so that the energy from the solar electric energy source both powers the plurality of warning lights and recharges the rechargeable power supply,
wherein the power controller selects the external power supply to trickle charge the rechargeable power supply from a source separate from the solar-electrical energy source during normal operation of the vehicle using excess energy generated by a power train of the vehicle,
wherein the external power supply provides a substantially continuous and substantially constant charge to the rechargeable power supply, wherein the external power supply supplements the charge provided to the rechargeable power supply by the solar-electrical energy source, and
wherein trickle charging the rechargeable power supply comprises wireless charging via a connection between the rechargeable power supply and the external power supply via two electromagnetic coils.

11. The light bar of claim 10, further comprising:
a light sensor for sensing an illumination condition,
wherein the power controller switches among the solar-electrical energy source, the rechargeable power supply, and the external power supply to power the at least one electrical lighting device in accordance with the illumination condition.

12. The light bar of claim 10, wherein the solar-electrical energy supply includes one or more solar cells disposed on an outer surface of the closed housing.

13. The light bar of claim 10, wherein the power controller selects both the solar-electrical energy supply and the external power source to charge the rechargeable power supply so that the external power supply complements the solar-electrical energy supply.

14. A method for providing energy to a vehicle-mounted emergency device, including:
drawing power from a first source disposed within a housing of the emergency device;
delivering the drawn power to a signaling device within the emergency device; and
during normal operation of the vehicle, controlling a confluence of energy from the first source and a second source so that the signaling device receives all of the energy the signaling device requires to operate properly and to cause the second source to charge the first source when more energy than required by the signaling device is available from the second source;
drawing energy from a third source external of the emergency device so as to complement the first and second sources; and
selecting the third source, that is separate from the first and second sources, to trickle charge the first source so as to complement the second source during normal operation of the vehicle,
wherein the third source provides a substantially continuous and substantially constant charge to the first source,
wherein the third source supplements the charge provided to the first source by the second source, and
wherein trickle charging the first source comprises wireless charging via a connection between the first source and the third source via two electromagnetic coils.

15. The method of claim 14, further including:
detecting an illumination condition, and
controlling the confluence of energy in response to the detected illumination condition.

16. The method of claim 14, further including selecting at least one of the second and third sources to charge the first source.

* * * * *